(12) United States Patent
Margolin

(10) Patent No.: US 8,878,988 B1
(45) Date of Patent: Nov. 4, 2014

(54) GLARE BLOCKING CAMCORDER/CAMERA STABILIZING EYE LEVEL VIEWFINDER DEVICE AND METHOD

(71) Applicant: George Margolin, Newport Beach, CA (US)

(72) Inventor: George Margolin, Newport Beach, CA (US)

( * ) Notice: Subject to any disclaimer, the term of this patent is extended or adjusted under 35 U.S.C. 154(b) by 1 day.

(21) Appl. No.: 13/844,308

(22) Filed: Mar. 15, 2013

Related U.S. Application Data

(63) Continuation-in-part of application No. 12/814,436, filed on Jun. 11, 2010, now Pat. No. 8,493,507.

(51) Int. Cl.
   *H04N 5/225* (2006.01)
   *H04N 5/222* (2006.01)
   *H04N 5/232* (2006.01)

(52) U.S. Cl.
   CPC .................................. *H04N 5/23293* (2013.01)
   USPC ...................................... 348/375; 348/333.01

(58) Field of Classification Search
   CPC   H04N 5/23293; H04N 5/2251; H04N 5/2252
   USPC ............. 348/333.01, 333.06, 333.07, 333.08, 348/373, 375, 376; 396/373, 374, 535
   See application file for complete search history.

(56) References Cited

U.S. PATENT DOCUMENTS

| | | | | |
|---|---|---|---|---|
| 2,500,058 | A * | 3/1950 | Brundage | 396/534 |
| 4,576,459 | A * | 3/1986 | Miura et al. | 396/534 |
| 4,865,420 | A * | 9/1989 | Schmidt | 359/601 |
| 4,991,935 | A * | 2/1991 | Sakurai | 359/804 |
| 5,069,529 | A * | 12/1991 | Takahashi | 359/601 |
| 5,218,474 | A * | 6/1993 | Kirschner | 359/601 |
| 5,988,823 | A * | 11/1999 | Wong | 359/601 |
| 6,144,418 | A * | 11/2000 | Kappel et al. | 348/834 |
| 6,144,419 | A * | 11/2000 | Schmidt | 348/842 |
| 6,419,367 | B1 * | 7/2002 | Dion et al. | 359/612 |
| 6,453,125 | B2 * | 9/2002 | Shono | 396/287 |
| 6,542,698 | B2 * | 4/2003 | Izawa | 396/287 |
| 7,034,877 | B2 * | 4/2006 | Schmidt | 348/333.01 |
| 7,196,742 | B2 * | 3/2007 | Skjellerup et al. | 348/834 |
| 7,336,896 | B2 * | 2/2008 | Jutamulia | 396/287 |
| 7,386,229 | B2 * | 6/2008 | Schmidt et al. | 396/534 |
| 7,486,887 | B2 * | 2/2009 | Tian | 396/544 |
| 2001/0019662 | A1 * | 9/2001 | Shono | 396/287 |
| 2002/0097997 | A1 * | 7/2002 | Izawa | 396/287 |

* cited by examiner

*Primary Examiner* — Nicholas Giles
(74) *Attorney, Agent, or Firm* — Lawrence S. Cohen

(57) ABSTRACT

A glare blocking viewfinder device includes a shadow box with a lens at a first end and an attachment mechanism at a second end adapted to detachably mount the device on a monitor screen of a camera. This enables a user to observe an image-bearing surface of the screen by looking at the image-bearing surface through the lens. The lens has a predetermined focal length and the depth dimension of the shadow box is substantially equal to this focal length. The attachment mechanism upon mounting the device to the monitor screen provides a substantially rigid structure. The user presses his or her eye against the lens to view the monitor screen through the lens and shadow box and points the camera at a subject, keeping the camera on the subject by using the device as a viewfinder. The user holds the camera with one hand and the attached device with the other hand. The device is collapsible and conveniently fits into a pocket of the user when not being used.

10 Claims, 22 Drawing Sheets

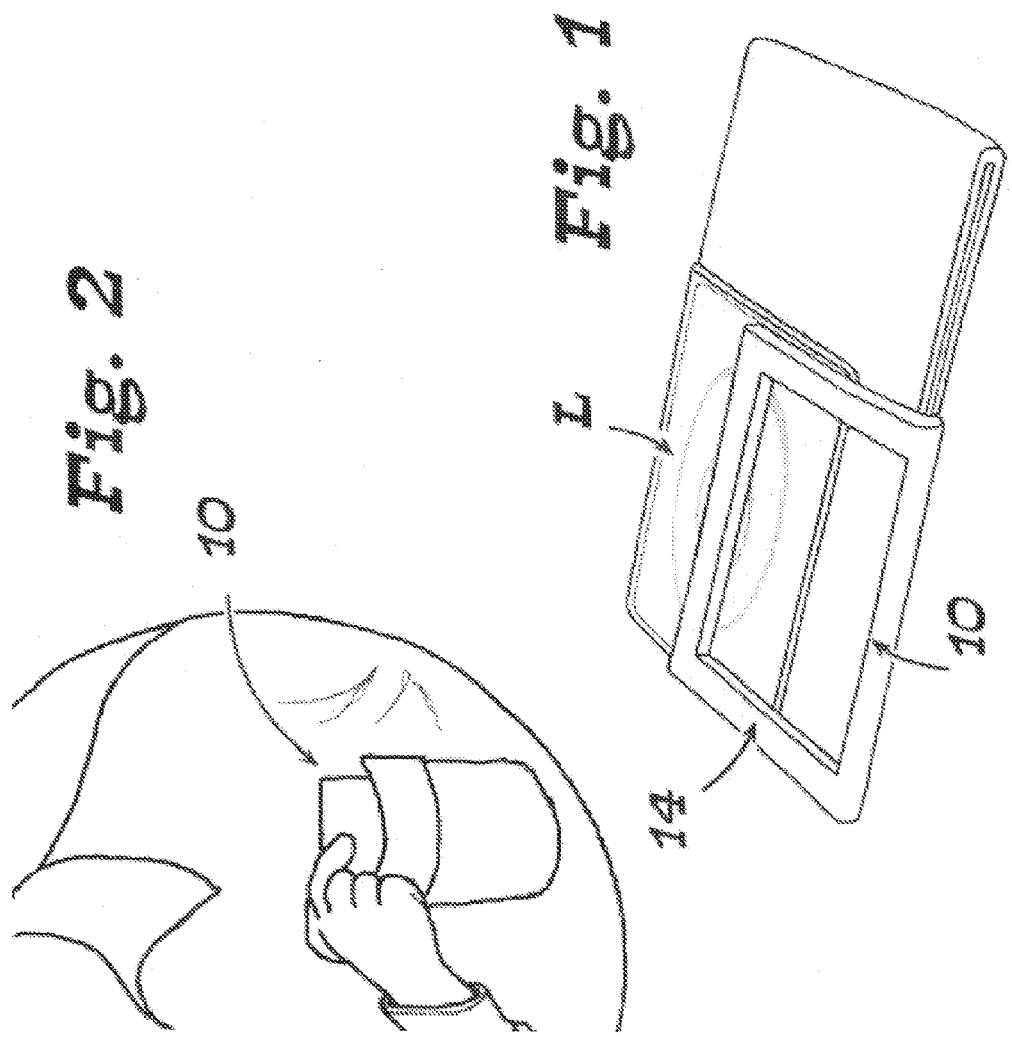

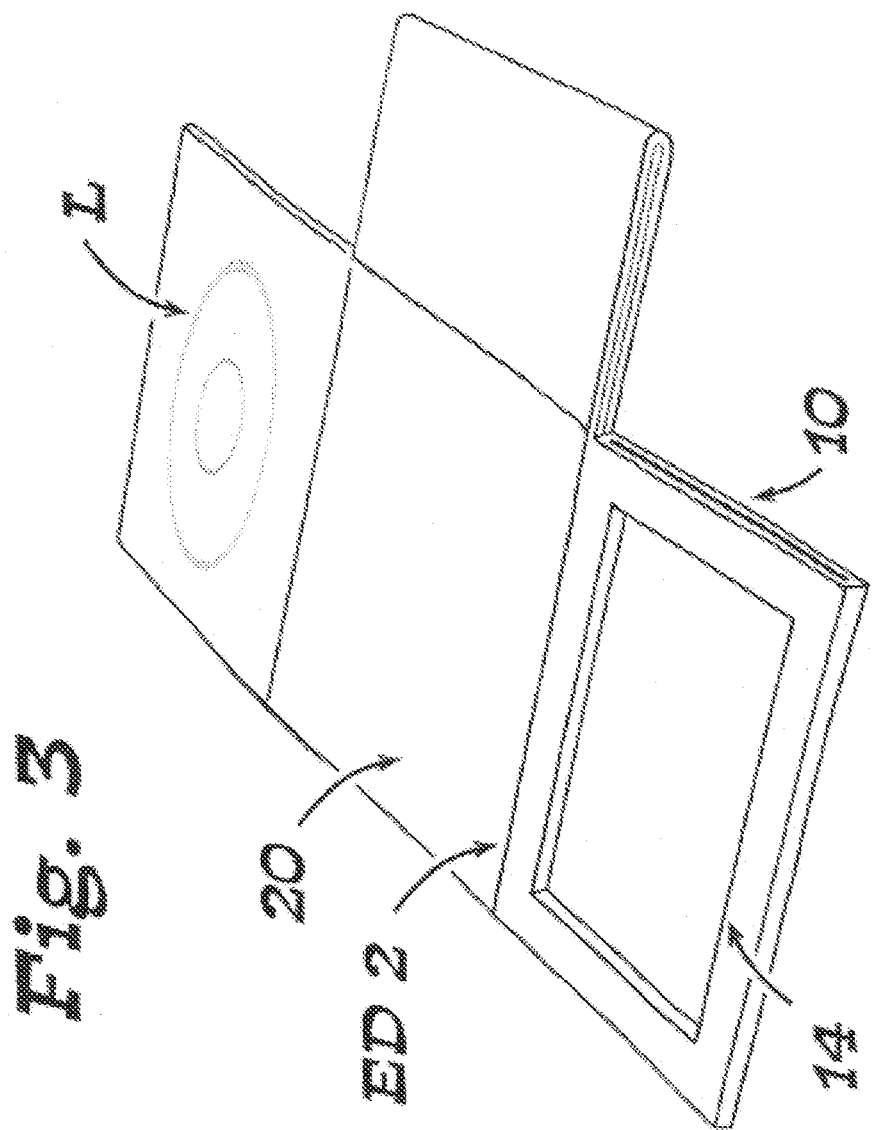

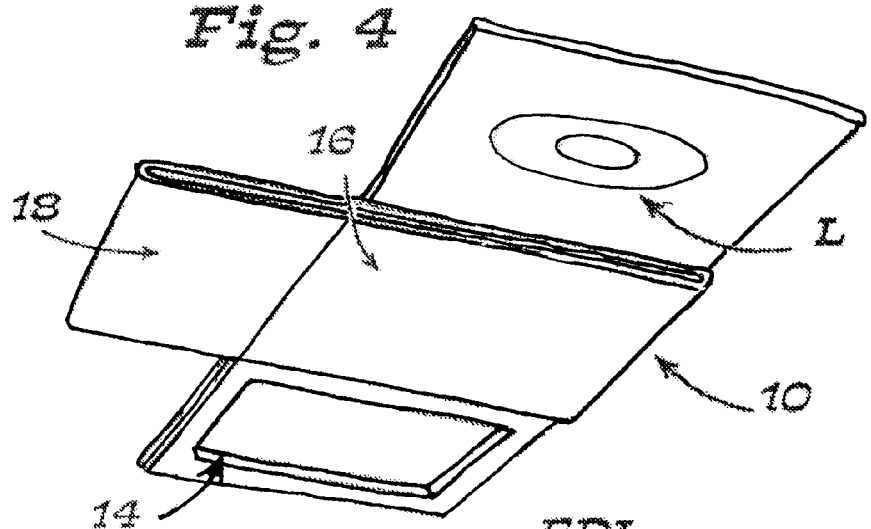
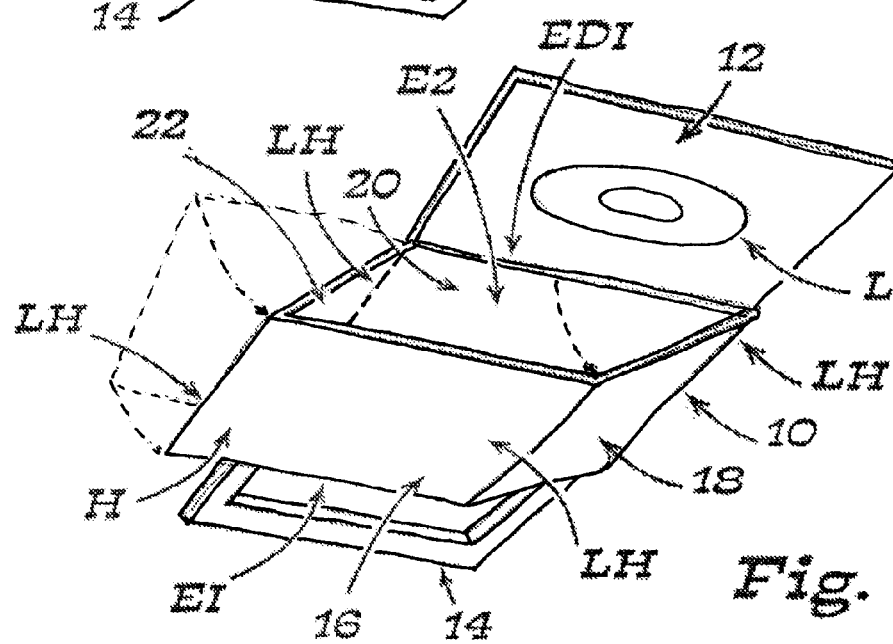

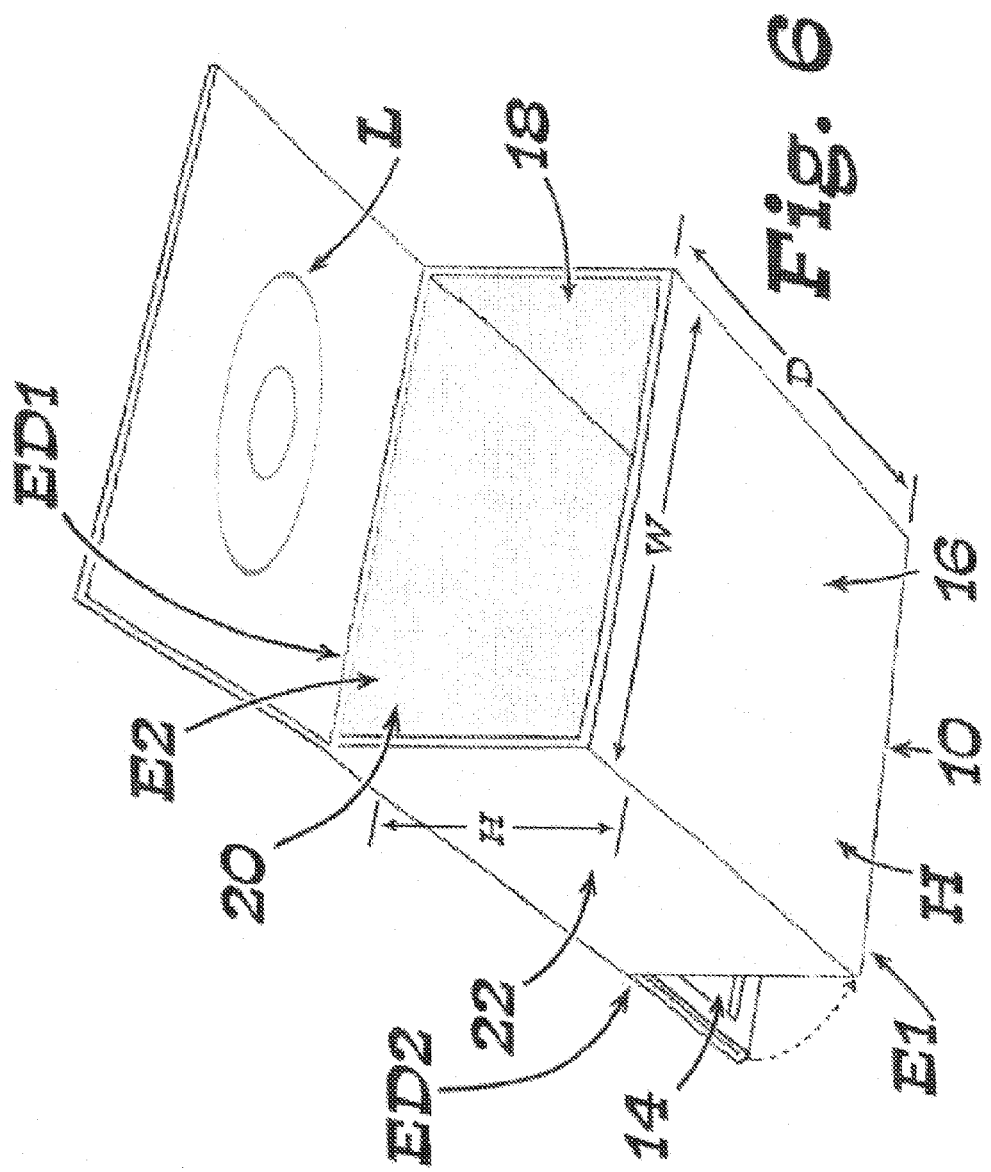

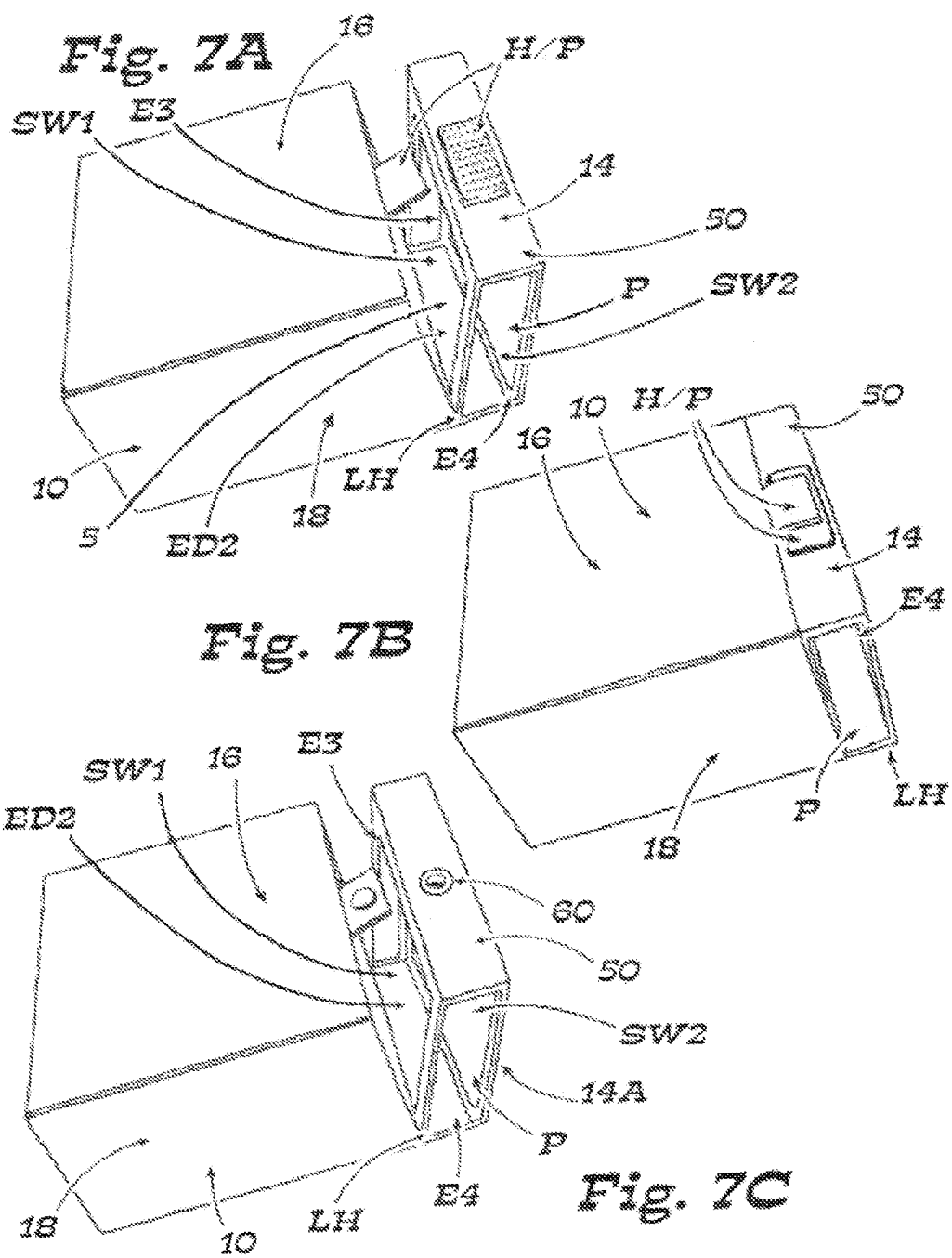

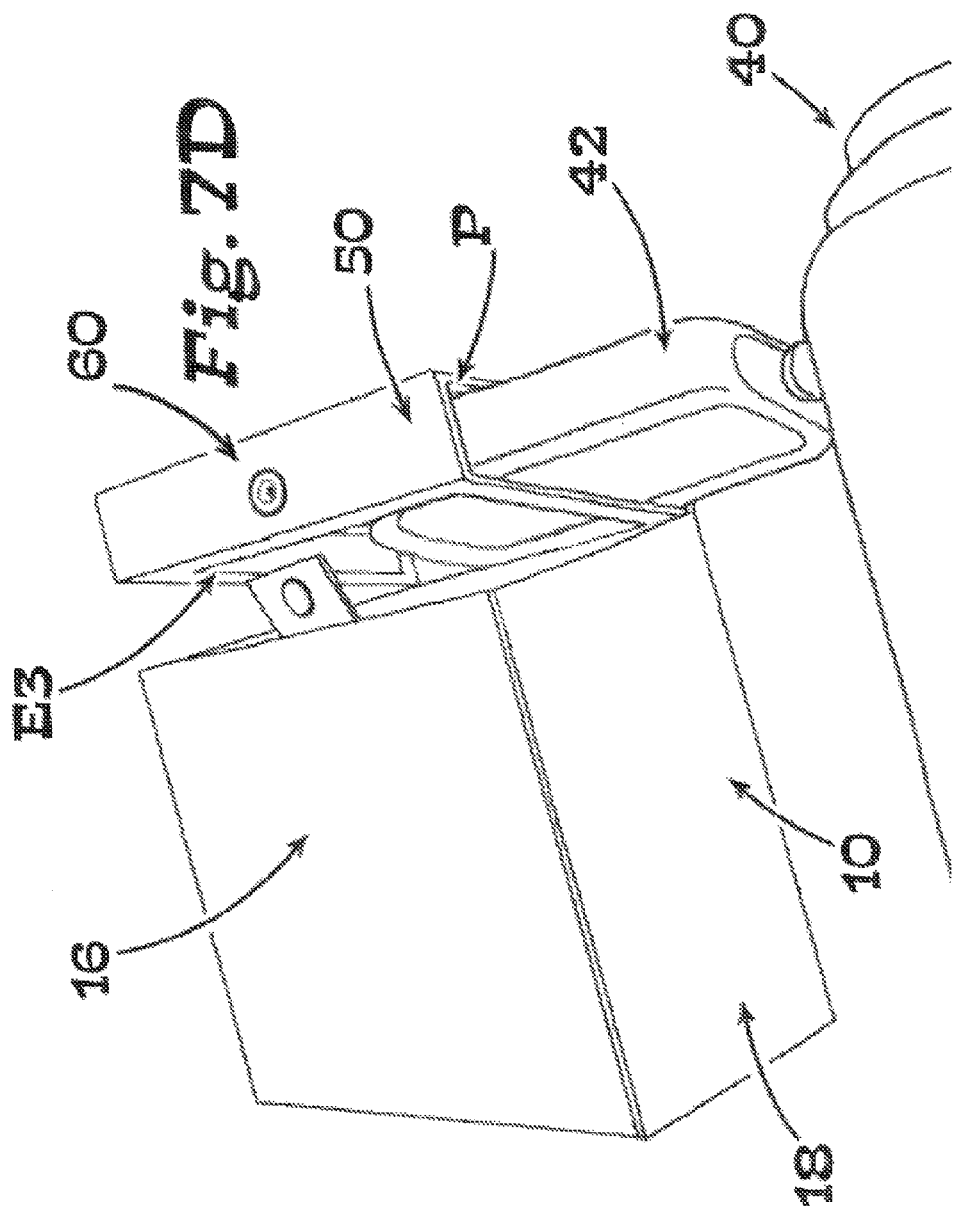

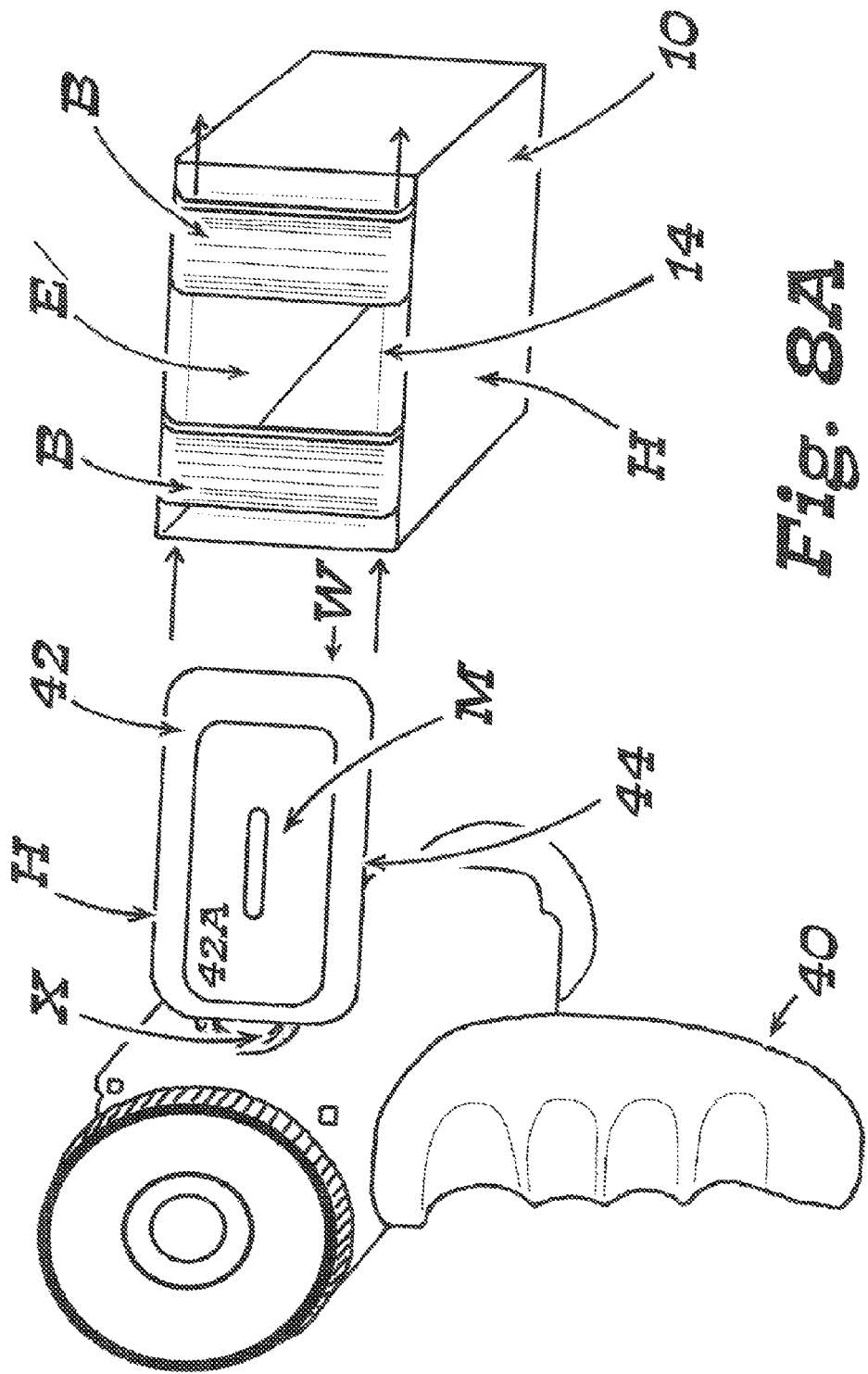

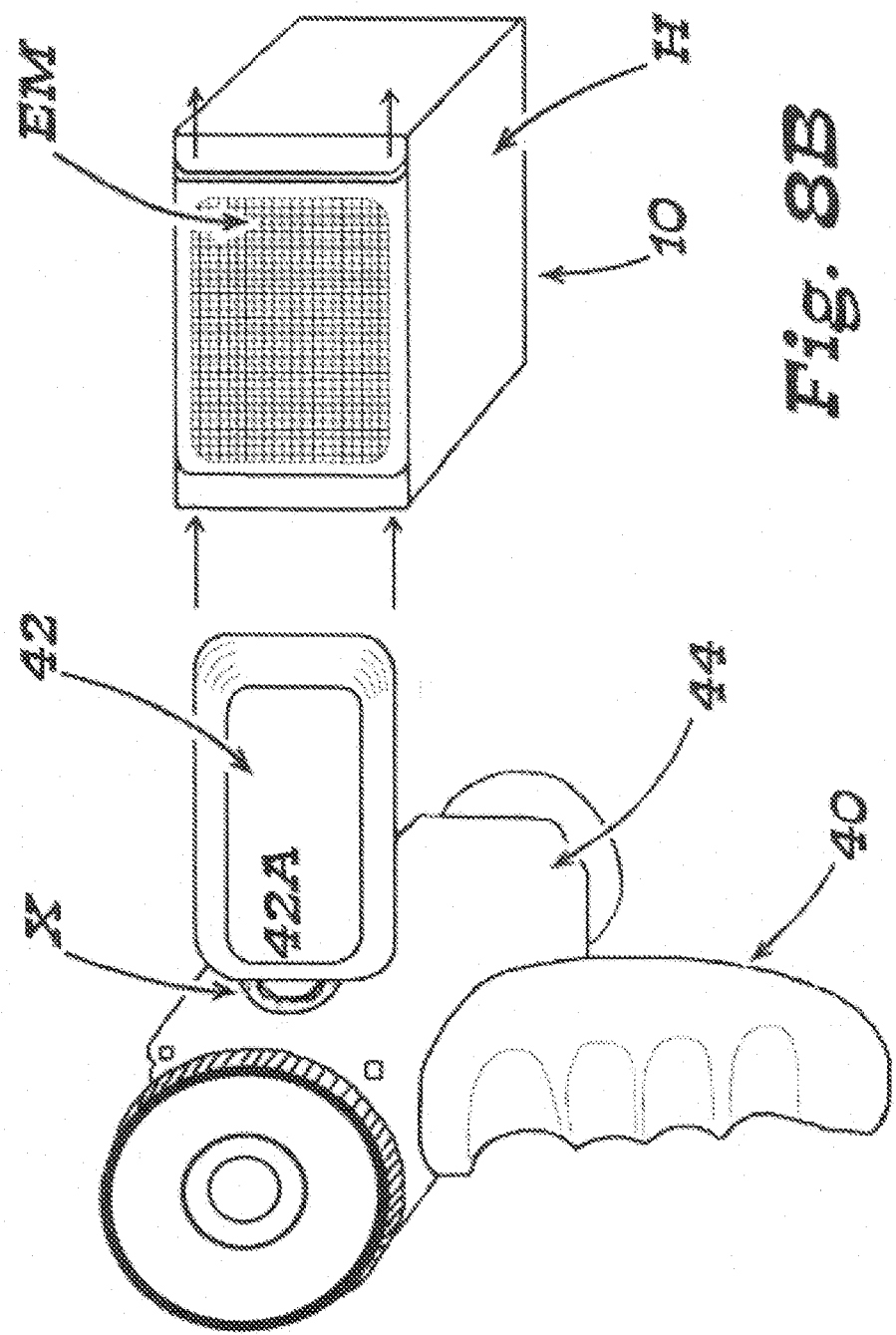

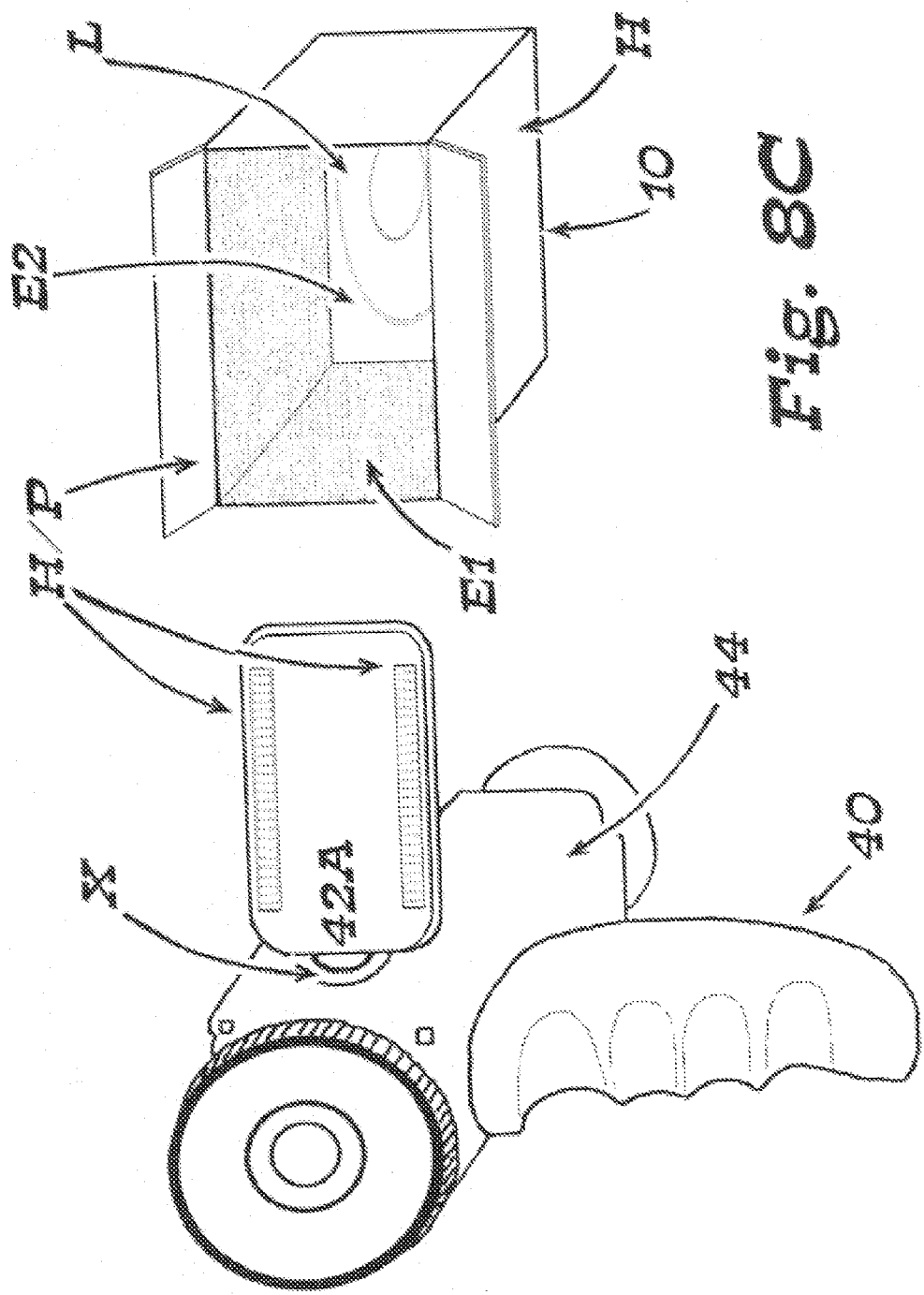

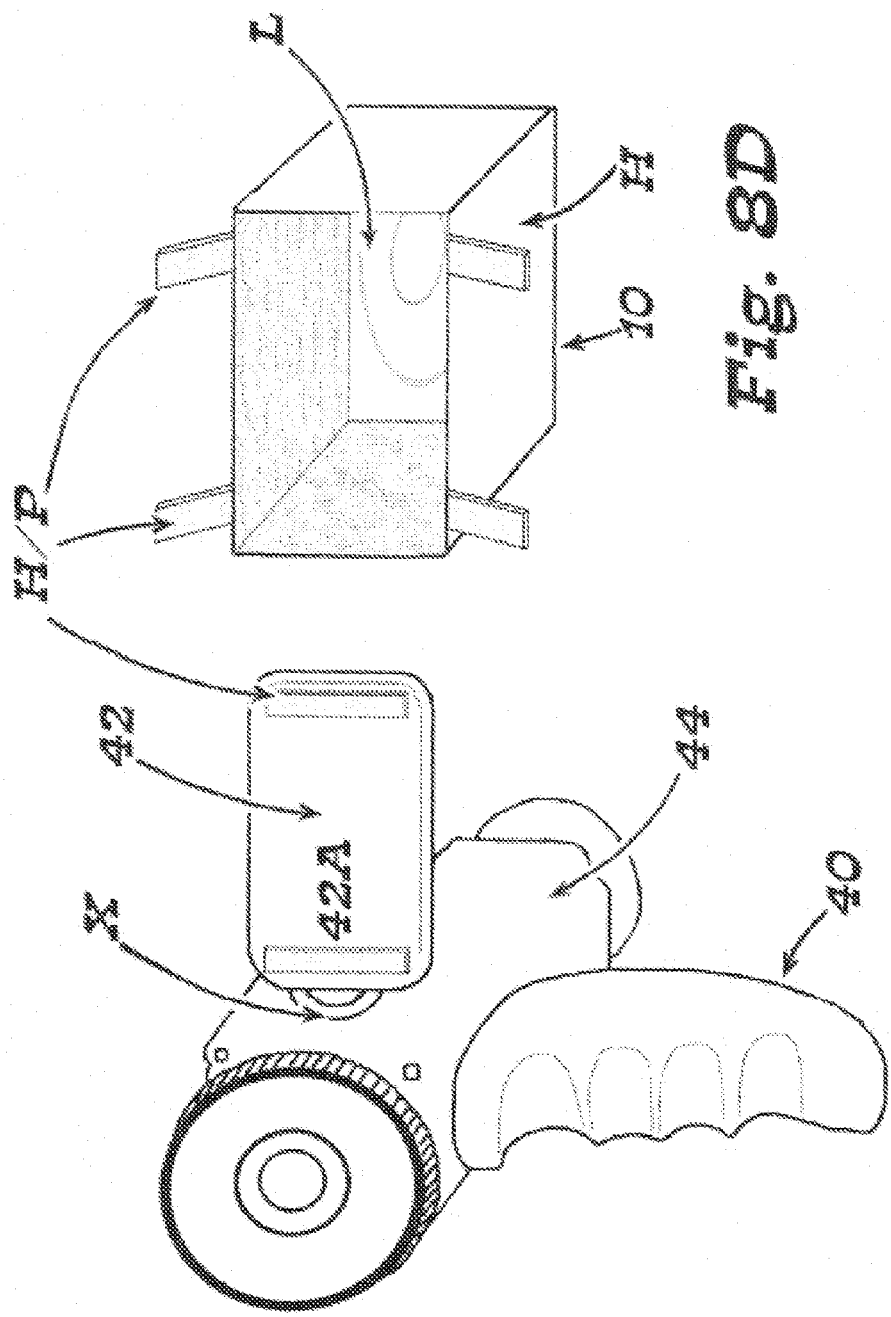

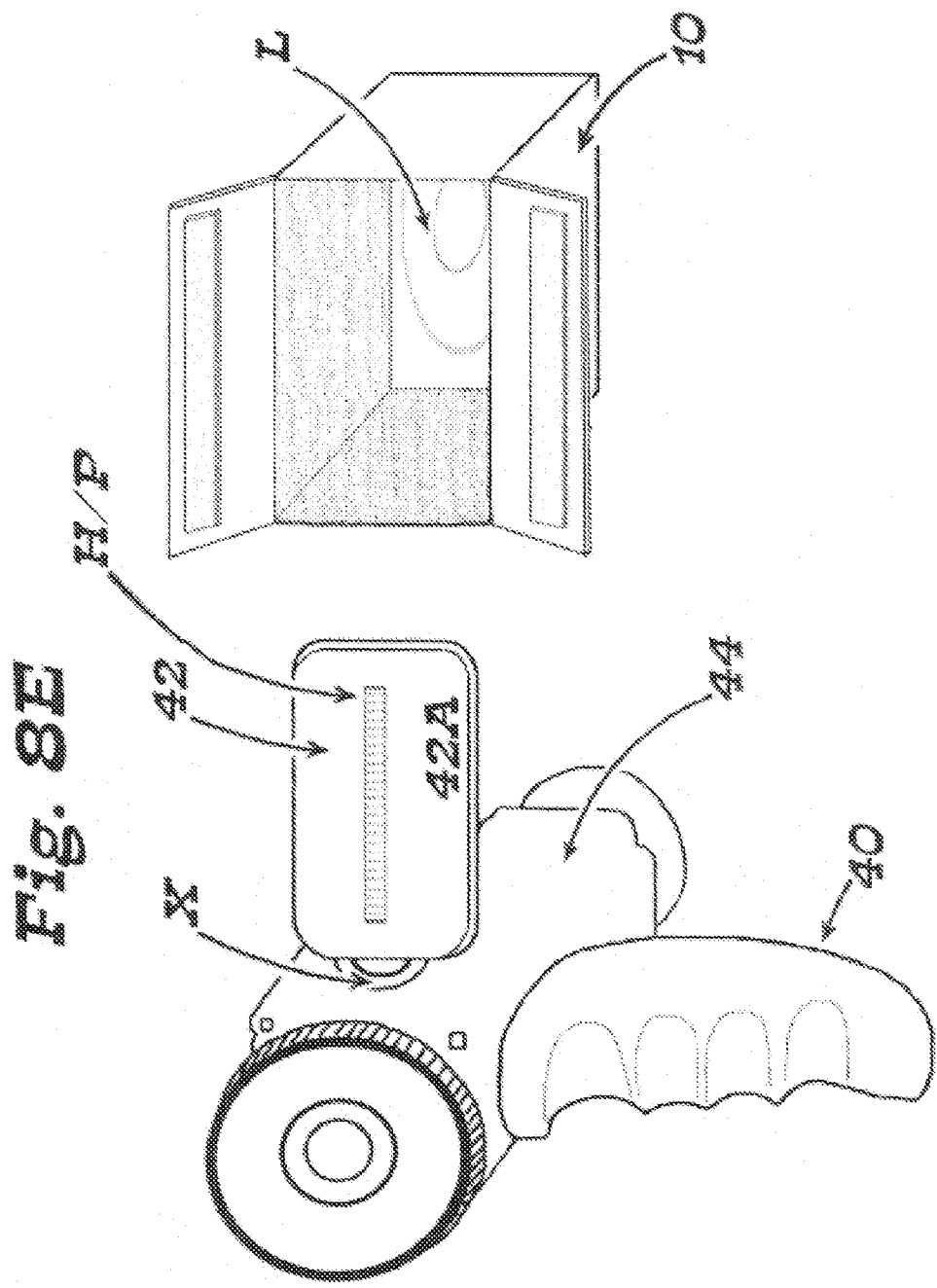

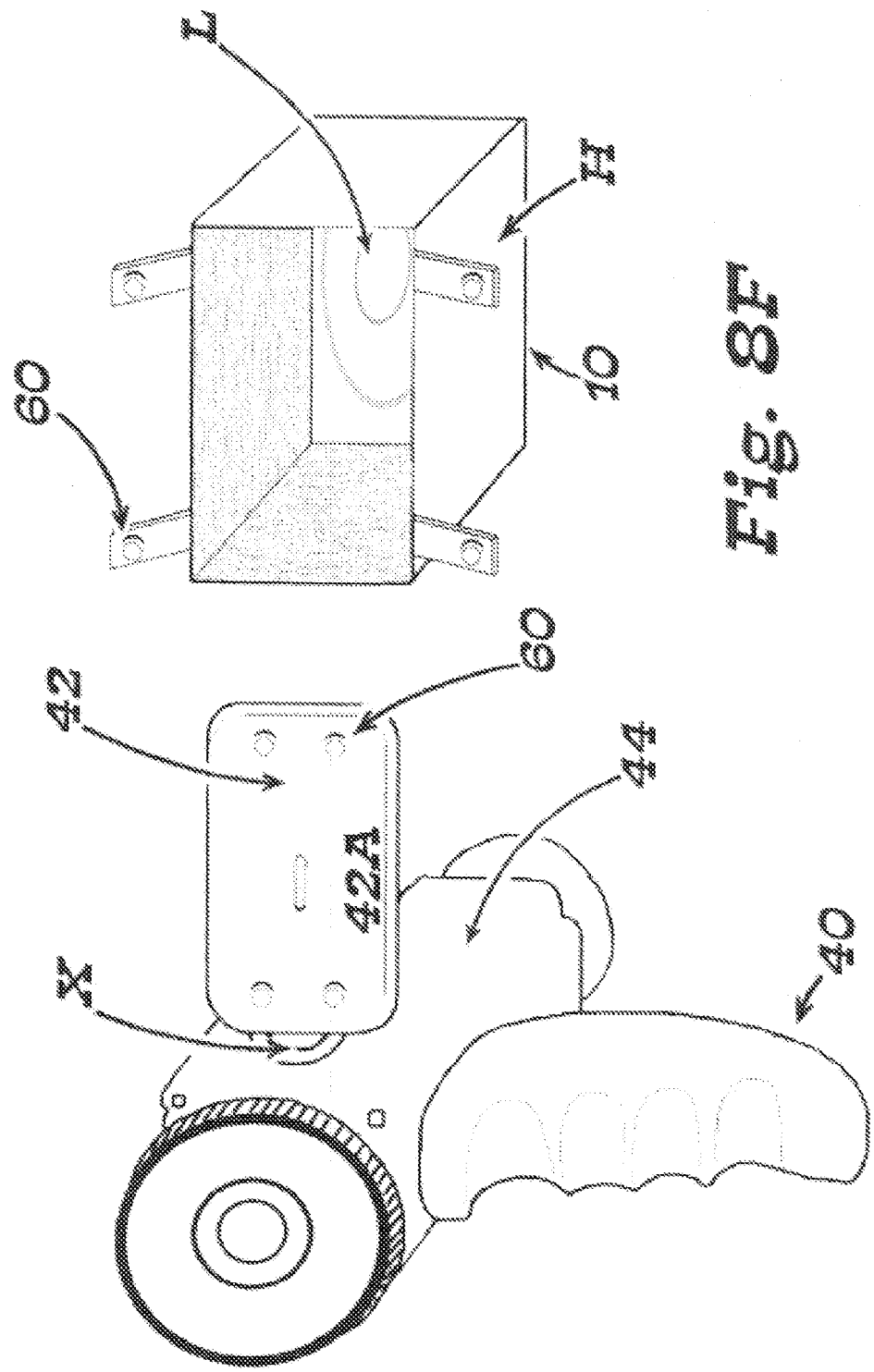

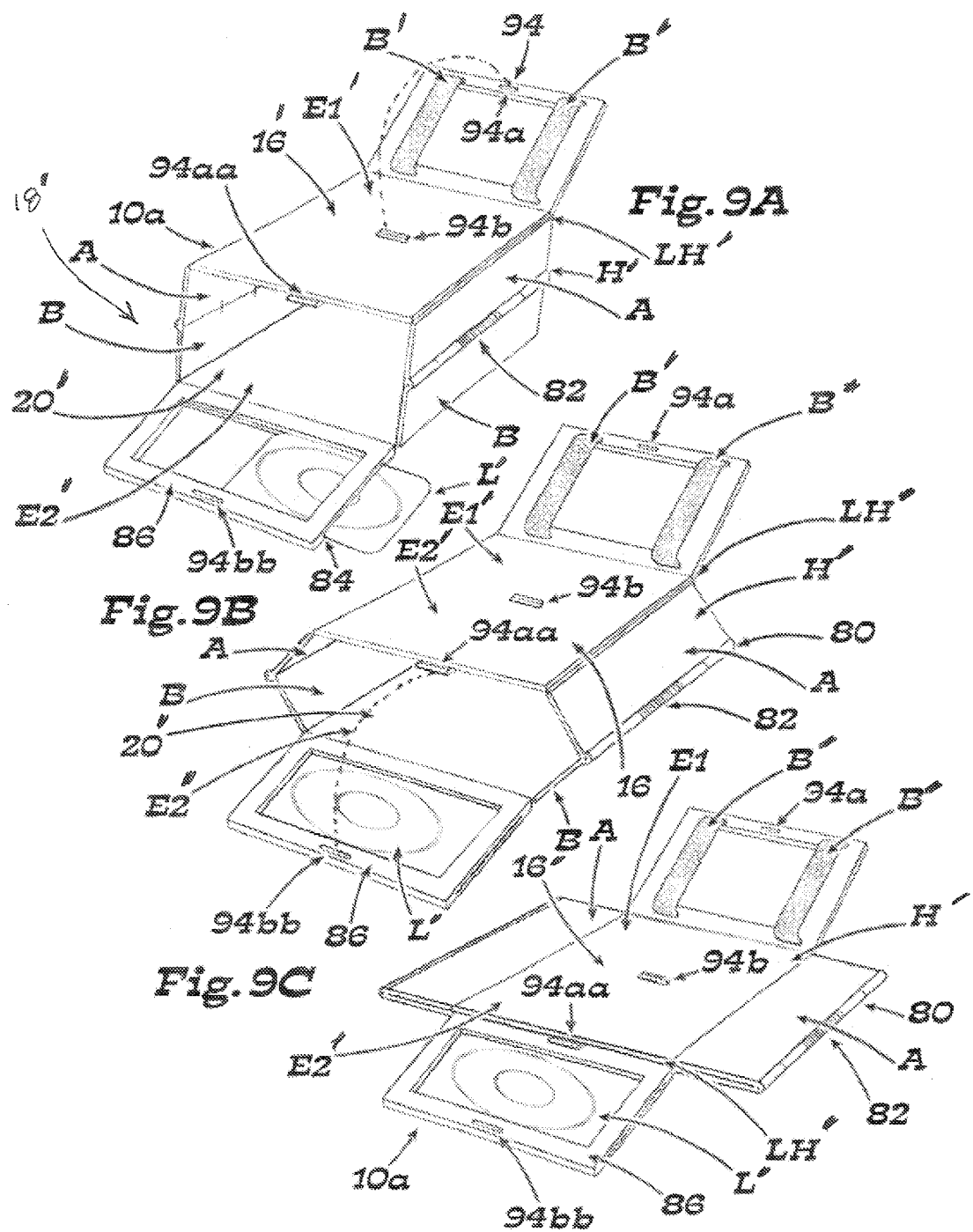

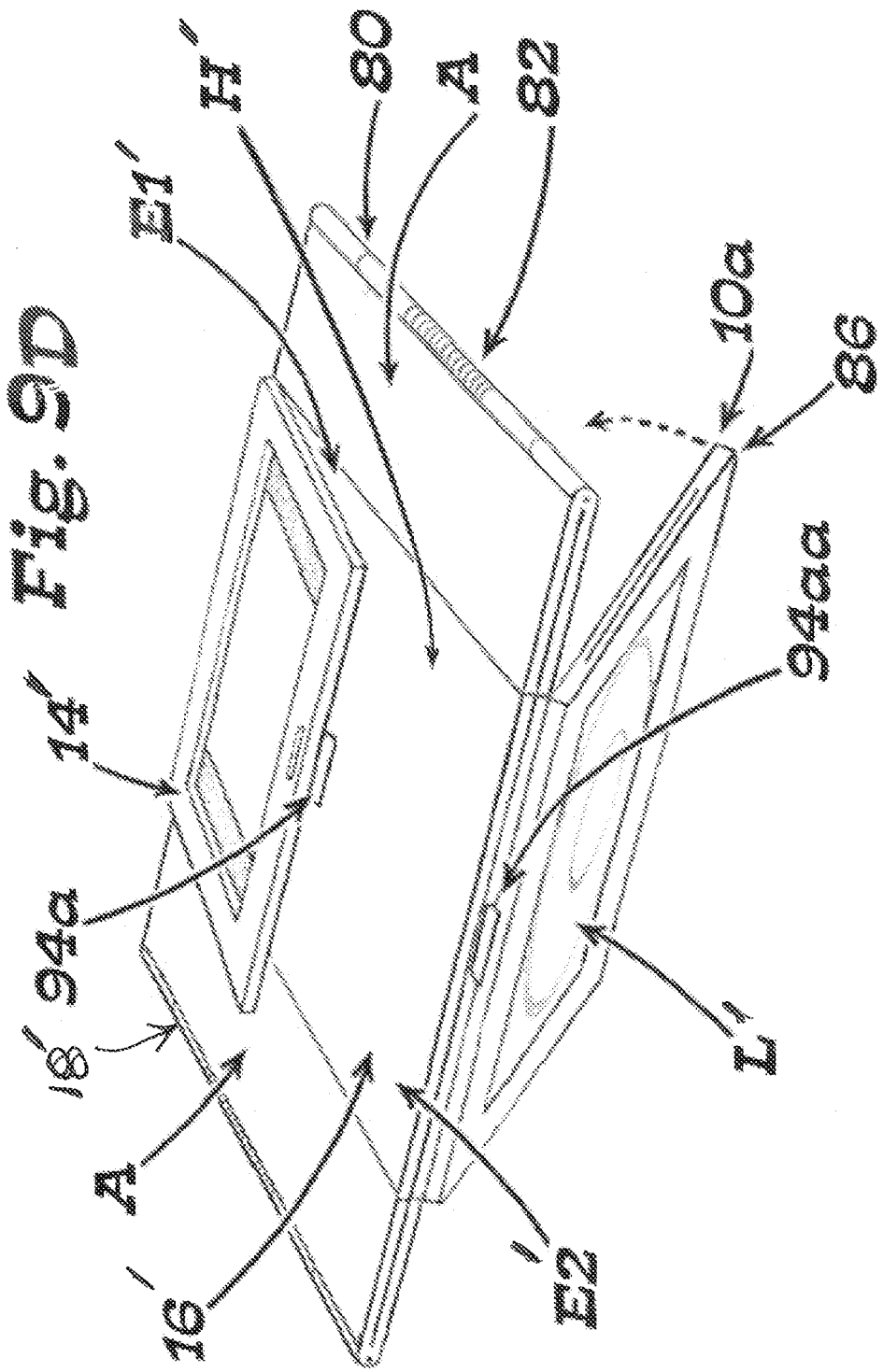

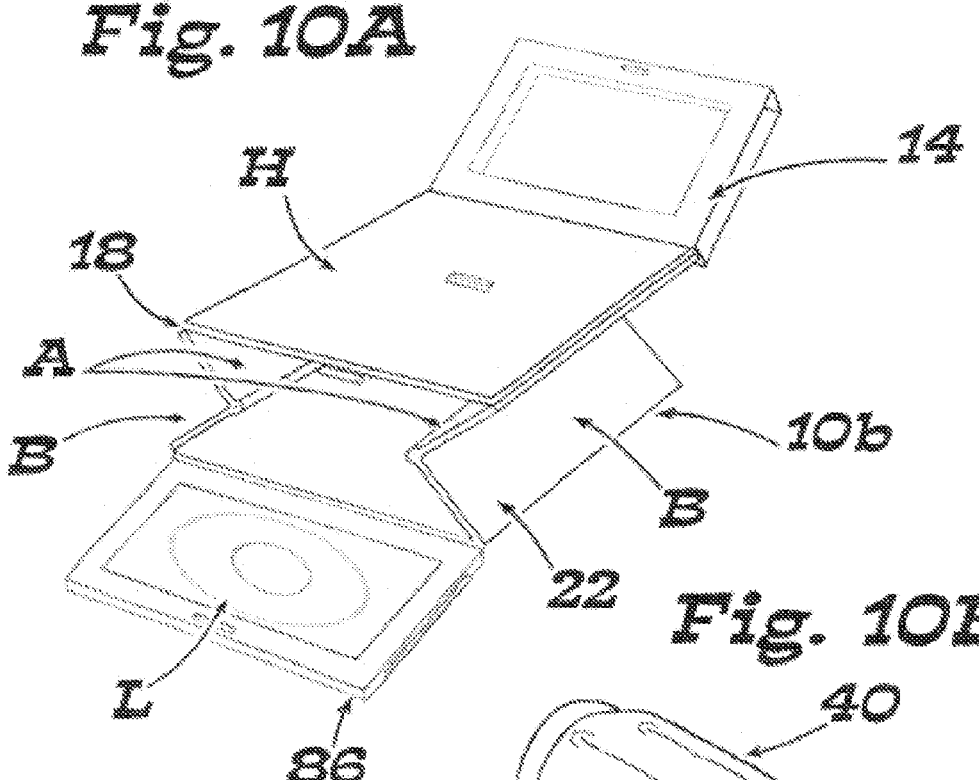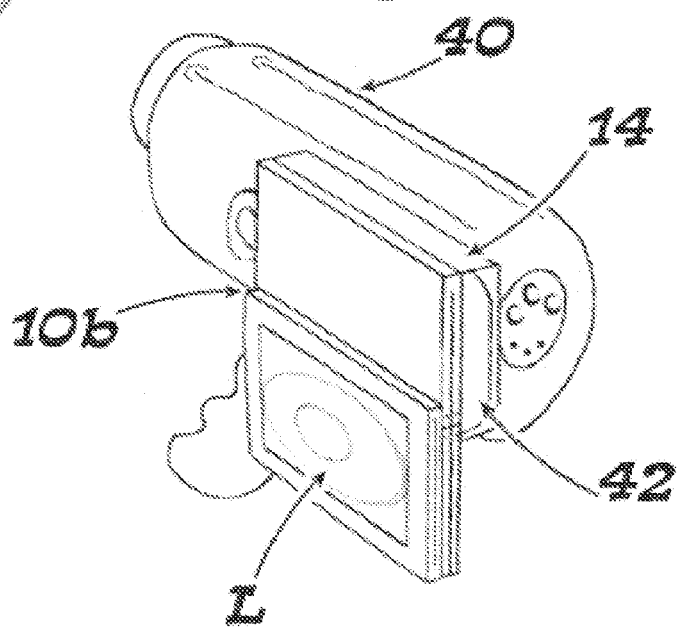

GLARE BLOCKING CAMCORDER/CAMERA STABILIZING EYE LEVEL VIEWFINDER DEVICE AND METHOD

RELATED PATENT APPLICATIONS & INCORPORATION BY REFERENCE

This utility application is a continuation-in-part of application Ser. No. 12/814,436 filed on Jun. 11, 2010 which claims the benefit under 35 U.S.C. 119(e) of U.S. Provisional Patent Application No. 61/218,334, entitled "GLARE BLOCKING VIEWFINDER DEVICE AND METHOD," filed Jun. 18, 2009 which are incorporated herein by reference and made a part of this application.

DEFINITIONS

The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items.

The word "rectangular" includes square.

The words "substantially" and "essentially" have equivalent meanings.

The word "camera" includes a camcorder, still camera, a video camera, and other similar devices for taking moving or still pictures or both.

BACKGROUND

Small, lightweight, commercially available hand-held cameras have side mounted, wing-like flat panel imagers or LCD monitor screens that are moveably attached to the camera body to pivot between a stored position and an outwardly extended position from the camera body during use. Images of the object being photographed are displayed on the monitor screen. These cameras do not have built-in eye level viewfinders, so the user normally holds the screen away from his or her eyes at a normal reading distance from about 12 to about 18 inches. However, it is difficult—often impossible—to see these screen images in glaring sunlight. Consequently, anti-glare shields are sometimes used to cast a shadow on the screen, reducing glare that would wash out the screen image. For example, as taught in U.S. Pat. No. 6,419,367, a rigid device may be used that is inconvenient to store when not being used.

In addition to glare, another problem is camera stability. In general, the user holds such hand-held cameras with only one hand at a normal reading distance away from the eyes. Consequently, it is difficult to follow and capture acceptable images of fast action events like sports without some mechanism such as a tripod for stabilizing the camera. This, however, inhibits mobility. Moreover, since the screen is relatively small, it is difficult to see the image being displayed and track the action being recorded, especially for users with poor vision. Even many "professional" cameras with optical or digital viewfinders that have an ancillary flat panel monitor screens for displaying digital images, these digital images are unmagnified, difficult to see, and also prone to bright-light wash out.

SUMMARY

My glare blocking device and method has one or more of the features depicted in the embodiments discussed in the section entitled "DETAILED DESCRIPTION OF SOME ILLUSTRATIVE EMBODIMENTS." The claims that follow define my glare blocking viewfinder device and method of taking a picture using my device, distinguishing them from the prior art; however, without limiting the scope of my glare blocking device and method as expressed by these claims, in general terms, some, but not necessarily all, of their features are:

One, my glare blocking viewfinder device includes a shadow box having opposed first and second open ends and a predetermined depth dimension. There is a lens at the first end and an attachment mechanism at the second end. The depth dimension of the shadow box is substantially equal to the focal length of the lens.

Two, the lens is mounted to move between positions that cover and uncover the first end, which functions as the viewing end. The lens may be detachable or permanently affixed. In one embodiment, a substantially flat, thin, planar, rectangular lens is used that is mounted by a hinge to the shadow box to move through an arc of substantially 270° when moved in any one direction. For example, the lens may have an edge joined by a living hinge to the shadow box, folding and unfolding the lens to cover and uncover the first end. The lens may be a magnifying lens having a magnifying power, for example, of substantially from 2× to 5×.

Three, the attachment mechanism is adapted to detachably mount the device on a monitor screen of a camera. Upon mounting the device to the monitor screen a substantially rigid structure is provided that functions as a viewfinder substantially at the user's eye level. With the lens covering the first or viewing end, a user can observe the image-bearing surface of the screen at the second end of the shadow box by looking at it through the lens. The width and height dimensions of the lens, screen, and first and second open ends are all substantially equal in the embodiments illustrated. The attachment mechanism may have many forms. It may comprise at least one elastic member extending across the attachment end; it may include a magnet; it may comprise a hook and pile two-component connector; it may comprise an open sleeve with opposed open sidewalls and opposed open ends, enabling the monitor screen to be inserted into the sleeve through one end and images thereon to be viewed through the open sidewalls.

Four, my device has a closed, compact condition that, when in this condition, fits into a pocket of a user. In a folded, substantially planar state in which the shadow box is in the closed condition, the lens is folded inward to abut a surface of the closed shadow box. In one embodiment my device is maintained in this condition until a latch or latches are unlatched, and the device opens. For example, a spring-loaded hinge along a sidewall opens the shadow box automatically upon manual unlatching. In the open condition my device is mounted on a monitor screen to take pictures, and this assembly is very is stable, enabling the user to grasp the device with one hand and the camera with the other hand to track the movement of the subject and hold the assembly against the user's forehead next to the eye during viewing of the monitor screen.

My method of taking pictures uses a camera having a wing-like, side-mounted monitor. According to my method a user attaches my device to the monitor screen with the viewing lens positioned to cover the viewing end, and pressing his or her eye against the lens to view the monitor screen through the lens and shadow box, points the camera at a subject, keeping the camera on the subject by using the device as an eye level viewfinder. When using the embodiment of my device that has a folded and unfolded condition, the user first unfolds my device and the mounted it in the open condition to the screen by the attachment mechanism. The user holds the camera with one hand and the attached device with the other hand when following a subject being photographed, providing stability, control, and rapid tracking of the subject.

These features are not listed in any rank order nor is this list intended to be exhaustive.

DESCRIPTION OF THE DRAWING

Some embodiments of my device and method are discussed in detail in connection with the accompanying drawing, which is for illustrative purposes only. This drawing includes the following figures (Figs.), with like numerals indicating like parts:

FIG. 1 is a perspective view of one embodiment of my glare blocking viewfinder device in a folded, substantially planar state.

FIG. 2 is a view depicting my device folded as shown in FIG. 1 and being inserted into a shirt pocket of a user.

FIG. 3 is a perspective view of the embodiment of my device depicted in FIG. 1 partially unfolded and looking at a topside of my device with its shadow box closed.

FIG. 4 is a perspective view of the embodiment of my device depicted in FIG. 1 partially unfolded but looking at a bottom side of my device with its shadow box closed.

FIG. 5 is a perspective view of the embodiment of my device depicted in FIG. 1 almost completely unfolded and its shadow box partially opened.

FIG. 6 is a perspective view of the embodiment of my device depicted in FIG. 1 completely unfolded and its shadow box completely opened.

FIG. 7A is a perspective view showing the embodiment of my glare blocking viewfinder device shown in FIG. 1 with its sleeve attachment mechanism partially unfolded.

FIG. 7B is a perspective view similar to FIG. 7A showing my glare blocking viewfinder device depicted in FIG. 1 with its sleeve attachment mechanism folded and latched in position to completely cover an open end of the shadow box.

FIG. 7C is a perspective view showing an alternate embodiment of my glare blocking viewfinder device using a sleeve attachment mechanism similar to that shown in FIGS. 7A and 7B employing a magnetic latch.

FIG. 7D is a perspective view of the embodiment of my glare blocking viewfinder device depicted in FIG. 7D showing the monitor screen of a hand held camera being inserted into a pocket of my device.

FIG. 8A is a perspective view showing an alternate embodiment using an elastic band attachment mechanism to detachably mount my device on the monitor screen of a hand-held camera.

FIG. 8B is a perspective view showing still another alternate embodiment using an elastic mesh attachment mechanism to detachably mount my device on the monitor screen of a hand-held camera.

FIG. 8C is a perspective view showing another embodiment using a hook and pile attachment mechanism to detachably mount my device on the monitor screen of a hand-held camera.

FIG. 8D is a perspective view showing yet another arrangement of a hook and pile attachment mechanism to detachably mount my device on the monitor screen of a hand-held camera.

FIG. 8E is a perspective view showing still another arrangement of a hook and pile attachment mechanism to detachably mount my device on the monitor screen of a hand-held camera.

FIG. 8F is a perspective view showing an embodiment of my glare blocking viewfinder device using a magnetic attachment mechanism to detachably mount my device on the monitor screen of a hand-held camera.

FIG. 9A is a perspective view of my glare blocking viewfinder device of FIG. 9 partially unfolded and showing the lens being inserted into a slot of a frame attached to the shadow box.

FIG. 9B is a perspective view of my glare blocking viewfinder device of FIG. 9 showing opposed sidewalls of the shadow box partially collapsed.

FIG. 9C is a perspective view of my glare blocking viewfinder device of FIG. 9 showing the shadow box completely collapsed.

FIG. 9D is a perspective view of my glare blocking viewfinder device of FIG. 9 showing its wall including the lens and the sleeve attachment mechanism is folded over the collapsed shadow box.

FIG. 10A is a perspective view of an other embodiment of my glare blocking viewfinder device similar to that shown in FIG. 9.

FIG. 10B is a perspective view of the embodiment of my device shown in FIG. 10A mounted for storage on a hand-held camera

Although the camera 40 illustrated is hand-held, the camera may be mounted to a tripod or monopod.

DETAILED DESCRIPTION OF SOME ILLUSTRATIVE EMBODIMENTS

Figure 11:
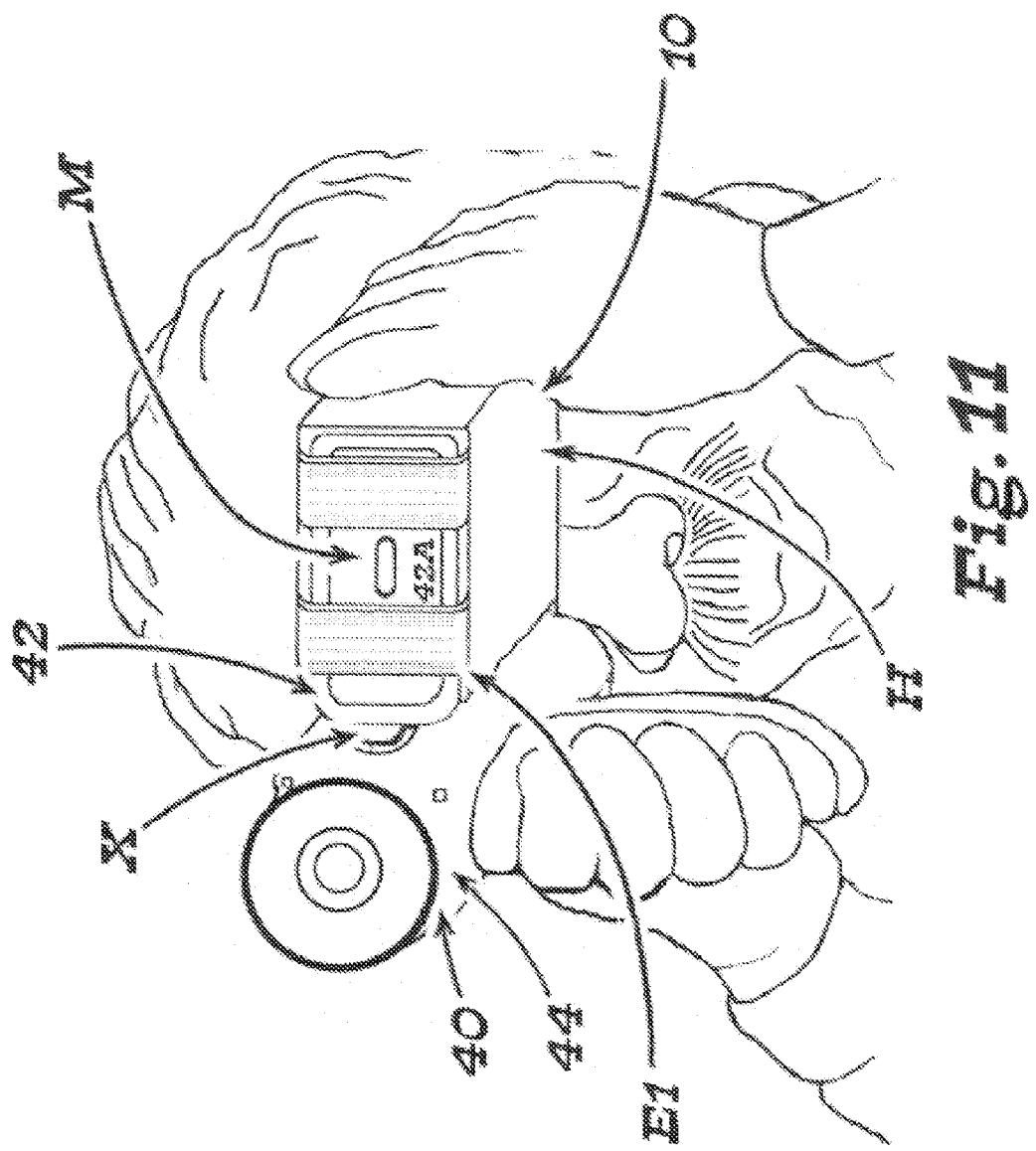
FIG. 11 is a perspective view of a user recording an action event with a hand-held camera equipped with an embodiment of my device using the one version of the attachment mechanism illustrated in FIG. 8A.

As illustrated in FIGS. 1 through 10, my device 10 conveniently slides on and off a monitor screen 42 of a hand held camera 40. (Although the camera 40 illustrated is hand-held, the camera may be mounted to a tripod or monopod). My device 10 blocks glare, provides an eye level viewfinder, magnifies the image on the monitor screen 42, and stabilizes the camera 40. It is particularly advantageous when using the hand-held video camera 40 to capture pictures of, for example, outdoor or indoor, fast action, dynamic events such as sporting contests and the like. My device 10 is adapted to be detachably mounted on a side mounted, panel-type, monitor screen 42 of the camera 40. As shown in FIG. 8A, this monitor screen 42 may include a microphone M in an outer, non-imaging surface 42a of the screen 42. The image-bearing surface (not shown) is opposite the surface 42a. As shown in FIG. 8A, this monitor screen 42 is substantially flat and rectangular and has a width w substantially from 2.5 to 4 inches and a height h substantially from 2.5 to 3.5 inches. Its thickness is typically substantially from ⅛ to ¼ inch. The panel monitor screen 42 may be attached to a side of the body 44 of the camera 40 by a pivot mounting X (FIG. 11).

Such small, hand-held cameras usually do not have an eye level viewfinder, thus requiring the user to hold the camera away from the eyes the normal reading distance. My device 10 functions as a viewfinder as illustrated in FIG. 11 by a user holding his or her eye up against a transparent magnifying lens L, which may be permanently attached to or integral with a collapsible shadow box H. In an alternate embodiment depicted in FIGS. 9 through 9E the lens is detachably mounted to the shadow box H. The lens L, because it is hingedly attached to the shadow box H, is capable of flipping over to cover an open end E2 or instantly flipping out of the way onto a top wall 20 (or bottom wall) of the shadow box H. The lens L may be a Fersnel lens.

My device 10 may be made of a sheet of plastic or other material that lends itself to formation of the shadow box H using thermoplastic manufacturing techniques as an integral, single piece construction. As illustrated best in FIGS. 1 through 6, the shadow box H may comprise four opaque walls 16, 18, 20, and 22 that are joined, for example, by a living hinge LH (FIG. 5) along longitudinal edges of each pair of adjacent walls 16, 18 and 18, 20 and 20, 22 and 22, 16. The shadow box H has opposed open ends E1 and E2. The end E1 is the attachment end to which the monitor screen 42 is detachably mounted and the end E2 is the viewing end that the user holds against his or her eye when viewing an image on the monitor screen as illustrated in FIG. 11. The lens L is substantially flat, thin and rectangular, and is integral with the shadow box H, being, as shown in FIG. 5, hingedly mounted by a living hinge LH to the end E2 along the one edge ED1 of the shadow box H wall 20. A suitable lens L is a Fresnel lens because it is very thin, flat and is available in a wide range of magnifying powers, for example, in my device 10, acceptable magnification is substantially from 2× to 5×. The lens L is permanently affixed to the shadow box H and folds and unfolds to cover and uncover the open viewing end E2, the lens moving through an arc of substantially 270° when moved in a clockwise or counter-clockwise direction.

When my device 10 is in a completely folded state as shown in FIG. 1, it may be conveniently and safely placed in a shirt pocket of a user as depicted in FIG. 2. In FIG. 6 my device 10 is shown in its completely unfolded state with the shadow box H open completely. When in the unfolded state as shown in FIGS. 8A through 8F, my device 10 is detachably connected to the monitor screen 42 projecting substantially at a right angle to the body 44 of the camera 40 by attaching means at the end E1 of the shadow box H. Any suitable attaching means may be used, and the following are examples of such attaching means: The embodiment shown in FIGS. 7A through 7C depict using a hinged sleeve attachment mechanism 14; the embodiment shown in FIG. 8A depicts using a pair of elastic bands B; the embodiment shown in FIG. 8B depicts using an elastic mesh EM attachment mechanism; the embodiments shown in FIGS. 8C through 8E depict using different versions of hook and pile H/P attachment mechanisms; and FIG. 8F depicts using magnets 60 as the attachment mechanism.

In the embodiment illustrated in FIGS. 7A and 7B, the sleeve attachment mechanism 14 comprises an open wall structure 50 forming a pocket P that receives the screen 42. As illustrated best in FIG. 7A, the wall structure 50 is attached by a living hinge LH to the wall 20 along the edge ED2 and folds over the open end E1 when the shadow box H is in an open condition as shown in FIG. 6. Alternately, sleeve attachment mechanism may be attached by flexible narrow elastic strips. The monitor screen 42 is inserted into the pocket P to detachably mount my device 10 when the screen projects substantially at a right angle to the body B of the camera 40 as shown in FIGS. 8A through 8F. The opposed sidewalls SW1 and SW2 are open. Consequently, when my device 10 is mounted on the monitor screen 42, the images being displayed on the monitor screen 42 may be observed through the lens L and a microphone M (FIG. 8A) in the outer surface 42a of the screen is uncovered.

Upon detaching by removal of the screen 42 from the pocket P, the wall structure 50 is folded inward towards the collapsed shadow box H. It may be first be folded to overlie the outer surface of the wall 20. Or, as shown in FIG. 1, to overlie the folded up lens L—an ideal folded condition where the wall structure 50 at least partially covers and protects the lens L that has been folded inward to abut an outer surface of the wall 20 before the wall structure 50 is folded inward. In either completely folded up arrangement, my device 10 is in a substantially planar state. In FIGS. 7A and 7B a hook and pile H/P two-component latch is depicted. In FIGS. 7C and 7D magnets 60 are used as a two-component latch. These two-component latches hold the wall structure 50 in the closed position after the monitor screen has been inserted into the pocket P.

In the embodiment illustrated in FIG. 8A, the pair of elastic straps or bands B eliminate use of the wall structure 50. The pair of elastic bands B are spaced apart and stretch across the width of the open end E1 over the exterior surface 42a of the monitor screen 42 inserted underneath the bands B, mounting my device 10 on the screen.

FIG. 8B depicts an elastic mesh EM stretching across the width of the open end E1 over the exterior surface 42a of the monitor screen 42 inserted underneath the mesh, mounting my device 10 on the screen. This mesh EM permits audio transparency for those wing-like monitor screen 42 having their microphones M placed on the surface 42a of the screen. This mesh EM is the equivalent of a flexible shadow box of like dimensions and elasticity but no openings, eliminating the need to provide openings for microphones.

FIGS. 8C through 8E depicts different arrangements of hook and pile H/P two-component connectors as the attachment mechanism. The pile may be on hinged flaps along the open end E1 and the hooks may be fastened to the outer, non-viewing surface 42a of the monitor screen 42.

As shown best in FIG. 6, in the open state, the shadow box H may have dimensions substantially as follows: a width w from 3 to 6 inches, a height h from 3 to 5 inches, and a depth d from 3 to 6 inches. The width w and height h of the shadow box H are substantially the same as the width and height dimensions of the monitor screen 42. The depth d of the shadow box H is substantially equal to the focal length of the lens L, which substantially ranges from 3 to 5 inches. Typically the lens has a magnifying power of 2× to 5×. Because of the relationship of the depth d of the shadow box H to the focal length of the lens L, the user can hold his or her eye next to the lens L and against the user's forehead as shown in FIG. 11.

When a wider shadow box H is used, for example substantially from 3.5 to 5 inches, both eyes may be used to view the monitor screen. With the advent of 3D cameras, my device can be adapted to provide separate left and right eye images as the camera shoots a 3D picture. Using my device 10 as an eye-level viewfinder and holding the camera 40 steady with both hands, in this example, the user grasps my device with the left hand and holds the camera with the right hand. And with my device 10 so mounted to the camera 40, the shadow box's function is to block sunlight directly impinging on the image-bearing surface (not shown) of the monitor screen 42. This prevents glare so the user can see the image-bearing surface of the monitor screen 42 without sunlight interfering with, or washing out, the screen image or the user's vision.

Figure 9:
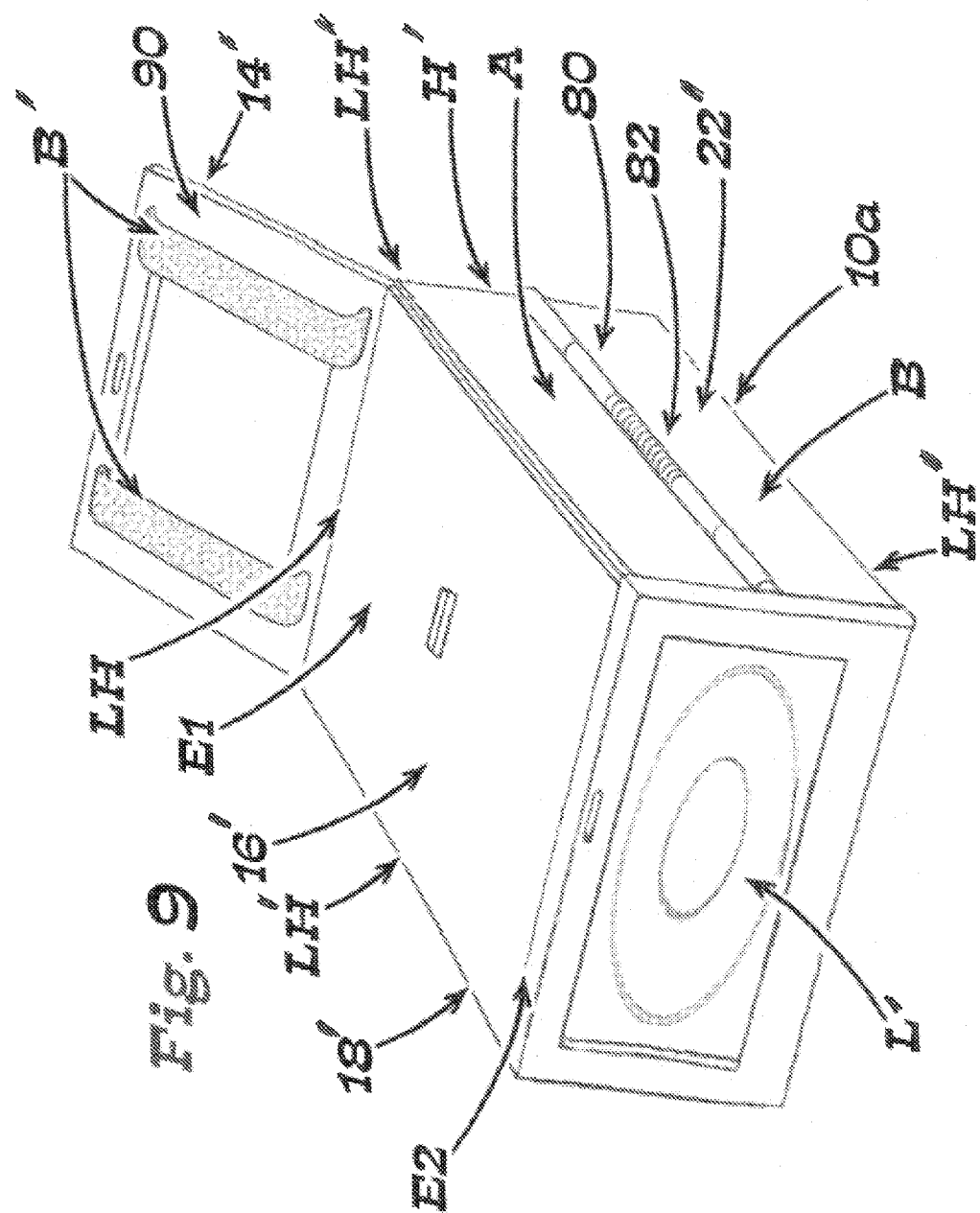
FIG. 9 is a perspective view of yet another embodiment of my glare blocking viewfinder device.

An alternate embodiment of my device designated by the numeral 10a is illustrated in FIGS. 9 through 9D. My device 10a is similar in most respects to my device 10 discussed above, except its shadow box H' includes opposed collapsible, opaque sidewalls 18' and 22'. Each of these sidewalls 18' and 22' are divided into substantially equal sized rectangular segments A and B that are connected by an elongated hinge 80 with a coiled or other type spring 82 along its length. A living hinge with tension acting spring also may be used. The shadow box H' also includes two additional opaque walls 16' and 20'. As illustrated in FIGS. 9A through 9D, these walls 16', 18', 20' and 22' are joined along longitudinal edges of each pair of adjacent walls 16', 18' and 18', 20' and 20', 22' and 22', 16' by, for example, a living hinge LH'. The shadow box H' has opposed open ends E1' and E2'. The end E1' is the attachment end and the monitor screen 42 is detachably mounted thereto using a sleeve attachment mechanism 14' connected by a living hinge LH' to the end E1' of the shadow box H'. The sleeve attachment mechanism 14' has a frame 90 with a pair of elastic bands B' stretched across the frame. The end E2' is the viewing end that the user holds against his or her eye or eyes when viewing an image on the monitor screen 42 as illustrated in FIG. 11. In this embodiment a lens L' is detachably mounted for replacement at low costs if damaged and slides into a slot 84 in a frame 86 attached by a living hinge LH' to the end E2' of the shadow box H'.

As best depicted in FIGS. 9A through 9D, my device 10a is folded into a substantially flat, planar structure. There are two-component latches 94 that engage upon folding my device 10a and hold it in this flat and planar condition until unlatched. Each latch 94 has one component on one wall and on an opposed wall the other component. For example, a suitable two-component latch 94 may comprise a finger 94a as one component and a channel 94b as the other component, with the finger fitting tightly in the channel until manually levered to disengage. These latches 94 upon being engaged hold my device 10a in the flat and planar condition until unlatched. Then the spring 82 automatically unfolds my device 10a into the condition shown in FIG. 9A. The latch 94 at the end E1' between the frame 86 and the top wall 16' is, however, re-latched by engaging the finger 94aa and the channel 94bb to position the lens L' as shown in FIG. 9. This properly positions the lens' with respect to the shadow box H'.

Still another alternate embodiment of my device designated by the numeral 10b is illustrated in FIGS. 10A and 10B. My device 10b is similar in most respects to my device 10a discussed above except it employs hinges 82' that fold the sidewalls 18' and 22' inward. When completed folded into a compact structure, my device 10b is conveniently mounted by its sleeve attachment mechanism 14' to a folded inward monitor screen 42 of the camera 40 as illustrated in FIG. 10B.

To use a camera equipped with my device 10, a user presses his or her an eye or eyes against the lens L to view the image-bearing surface of the monitor screen 42 through the lens L and points the camera 40 at, and follows a moving subject, keeping the camera steady and on the subject by using my device 10 as an eye level viewfinder. Thus, while the user holds the combination of the camera 40 and my device 10 steady with both hands (one hand gripping the camera and the other hand gripping my device), he or she moves the camera in a controlled manner to follow the action with the camera and simultaneously views the event or subject through my device's viewfinder lens L that magnifies the image on the camera's screen. My device 10 is sufficiently rigid for pressing against the user's face for acquiring fast action images yet instantly collapsible for storage in a shirt pocket.

Upon detaching by removal of the screen 42 from the attachment means of any of the embodiments, the shadow box is collapsed. In the case of the sleeve attachment mechanism 14, the wall structure 50 may be first folded to overlie the outer surface of the wall 20. Or, as shown in FIG. 1, to overlie the folded up lens L—an ideal folded condition where the sleeve attachment mechanism 14 at least partially covers and protects the lens that has been folded inward to abut an outer surface of a wall before the wall structure 50 is folded inward.

My device can also be configured to fold flat and be attached to the camera or the back of the wing viewfinder for carrying convenience without interfering with the functioning of the camera in its normal mode. It can then be erected for use as the glare blocking and magnifying device as described herein. In just about any folded up arrangement, each one of the embodiments my device are in a substantially planar state. My device provides a quick on/off stabilizing and magnifying eye level viewfinder that is foldable, small and flat enough to fit in a man's shirt pocket.

Figure 12A:
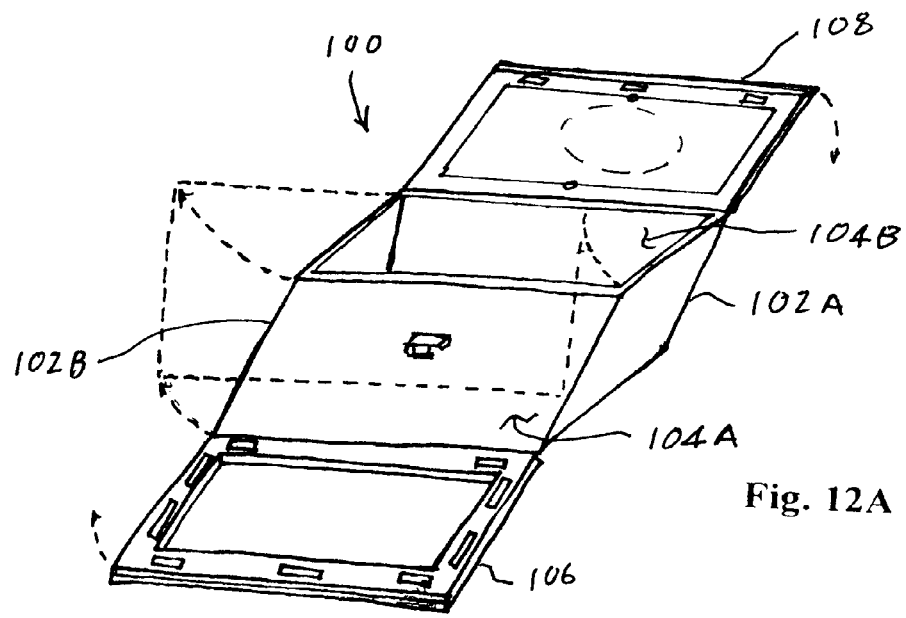
FIG. 12A is a perspective view showing the direction of motion for the collapse of the embodiment in the embodiment in which the lens is mounted in a rectangular frame which is hinged to one side of the shadow box and the attachment mechanism is a frame which is hinged to an opposing surface of the shadow box.
Figure 12B:
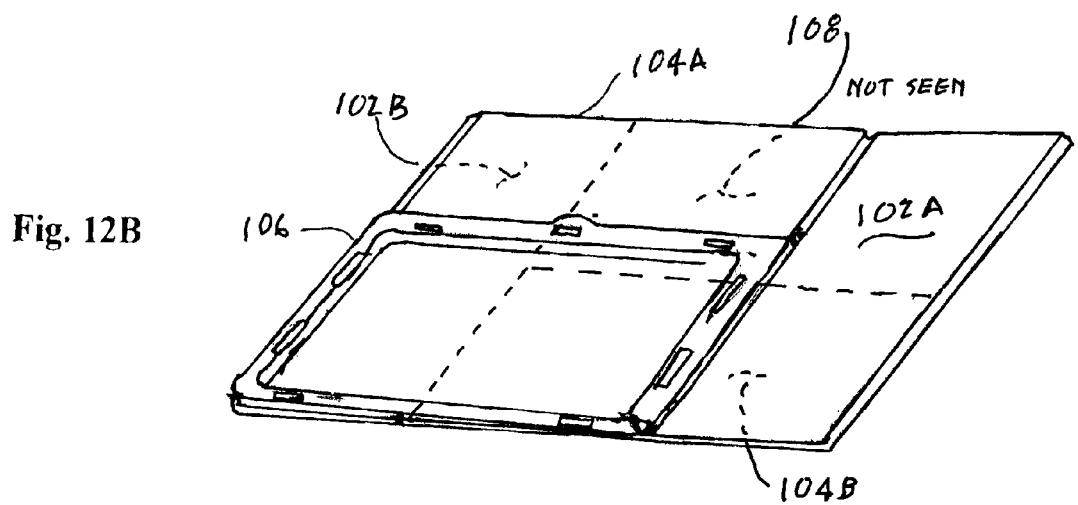
FIG. 12B is a perspective view showing the collapsed embodiment after the motion indicated in FIG. 12A.

FIG. 12A shows my device 100 being folded into its most compact flat configuration in which the box forming panels, vertical panels 102A and 102B, horizontal panels 104A and 104B are attached by living hinges (the entire box being made of a single molded piece of thermoplastic) and an attaching frame 106 (elastic members not shown) is attached by a living hinge to one of the horizontal panels 104A or 104B and the lens holding frame 108 holding a lens L is attached by a living hinge to the other of horizontal panels 104A or 104B. Note the terms vertical and horizontal are for easy reference but do not limit use of the device to any particular orientation. As shown by the arrows, the box forming panels fold down and the attachment frame and the lens frame also fold each into contact with the panel to which it is hinged. This then forms the very compact, flat configuration as shown in FIG. 12B which fits easily into a pocket or purse or small carrying bag.

Figure 13:
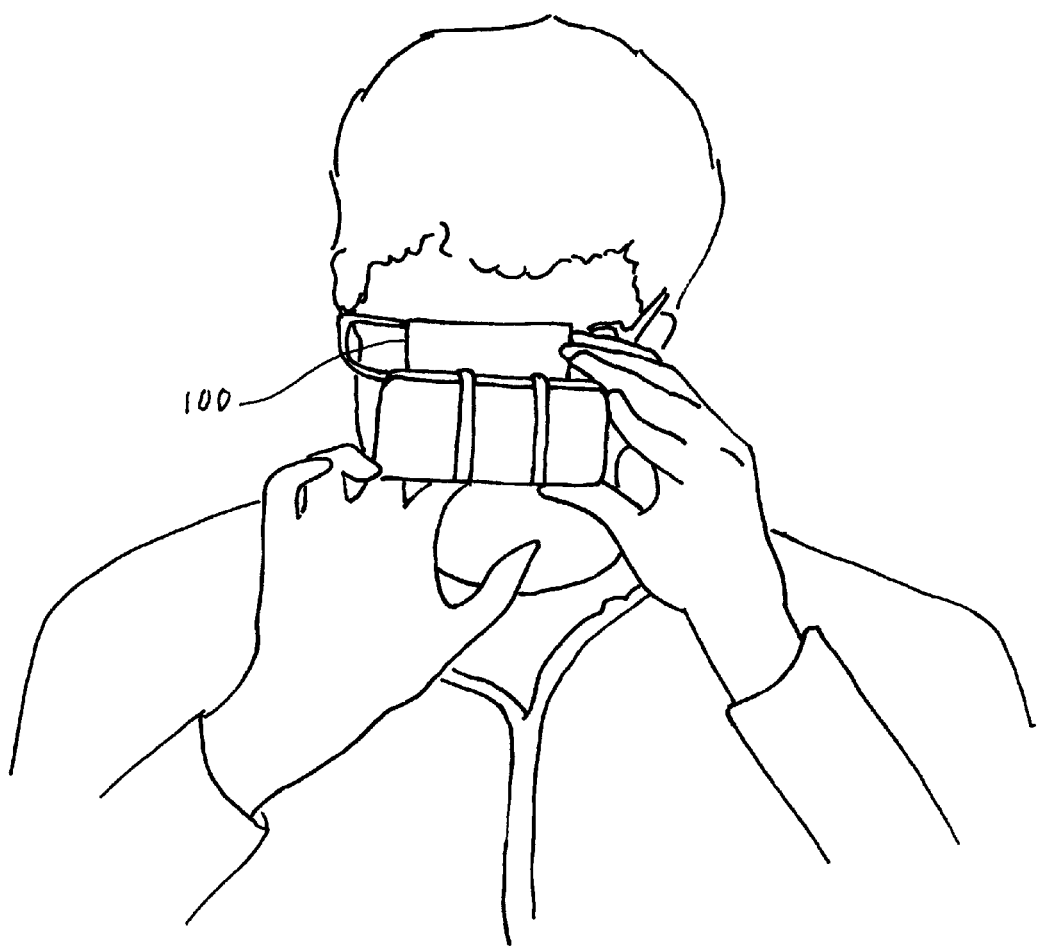
FIG. 13 is a perspective showing the embodiment attached to a smart phone device and in use.
Figure 14:
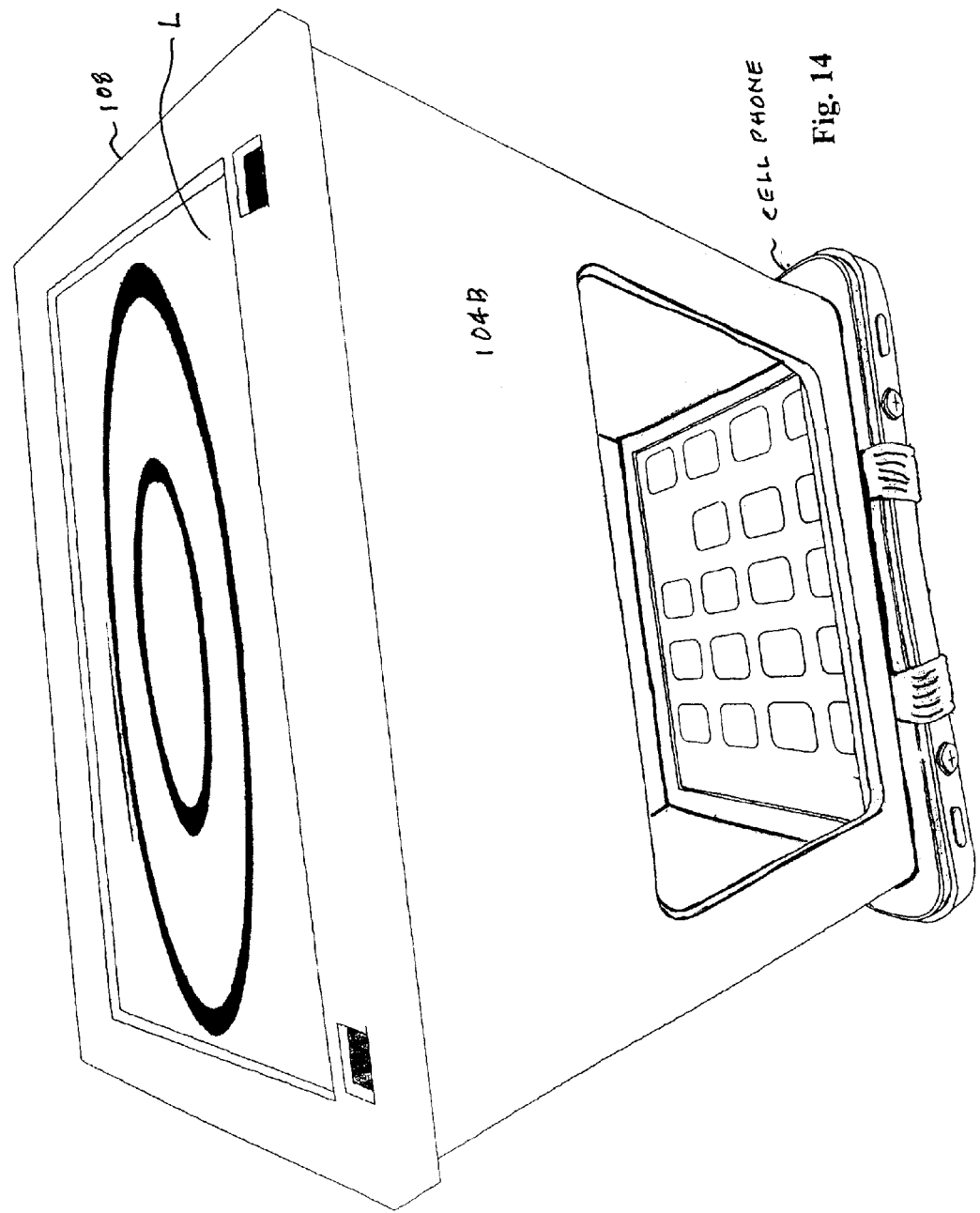
FIG. 14 is a perspective of the embodiment attached to a smart phone device in which there is an opening that allows the user to interact with the screen of the device attached to the embodiment.
Figure 15:
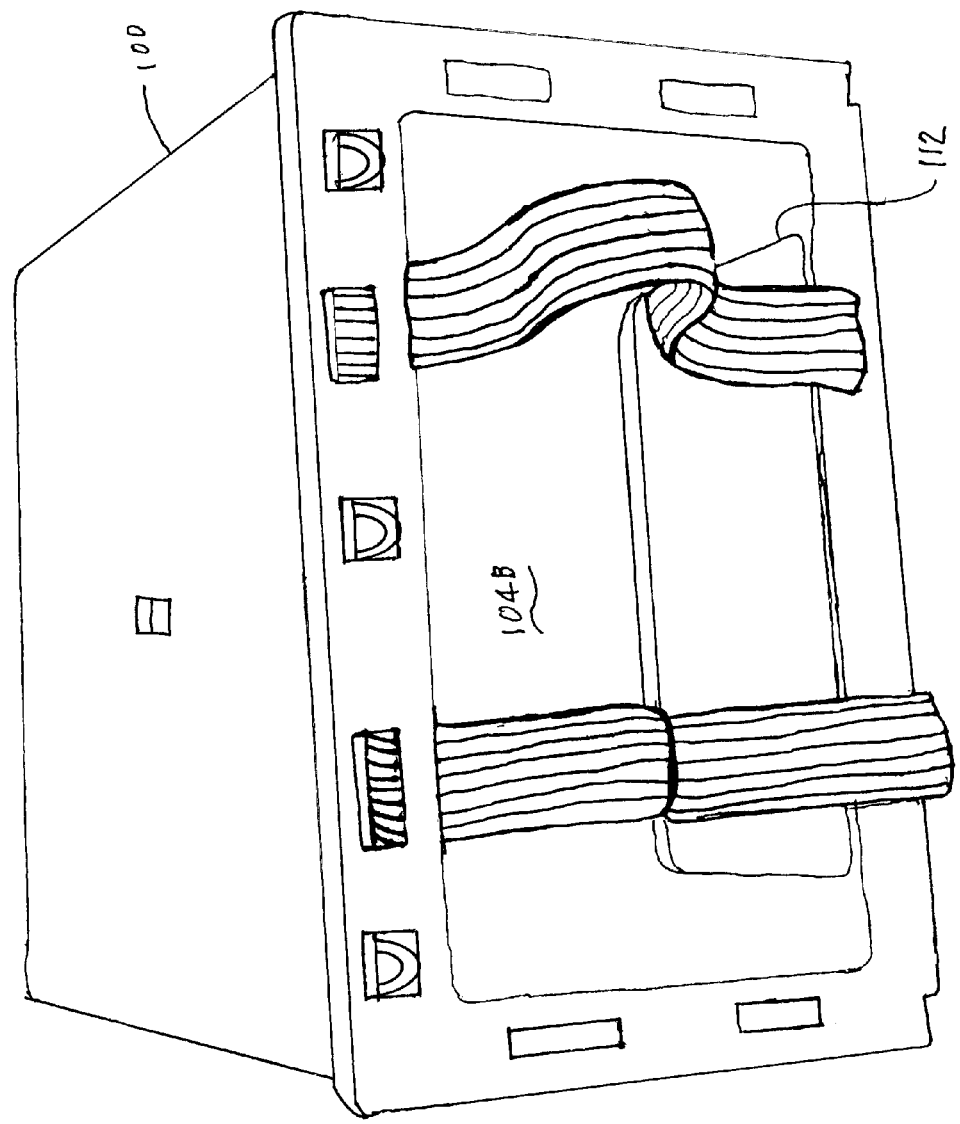
FIG. 15 is a second perspective of the opening of the embodiment that allows the user to interact with an attached device.

FIG. 13 shows a user holding the shadow box 100 attached to a cell phone such as an iPhone or Android or similar touch screen device, in which elastic bands 110A and 110B wrap around the cell phone and hold it securely to the attaching frame 106 (not seen in FIG. 13, see FIG. 14). FIG. 15 shows the device 100 having an aperture 112 in a bottom oriented horizontal panel 104B. FIG. 14 shows the device 100 attached to a cell phone showing a touch screen which is available to be operated by reaching through the aperture 112.

Figure 16A:
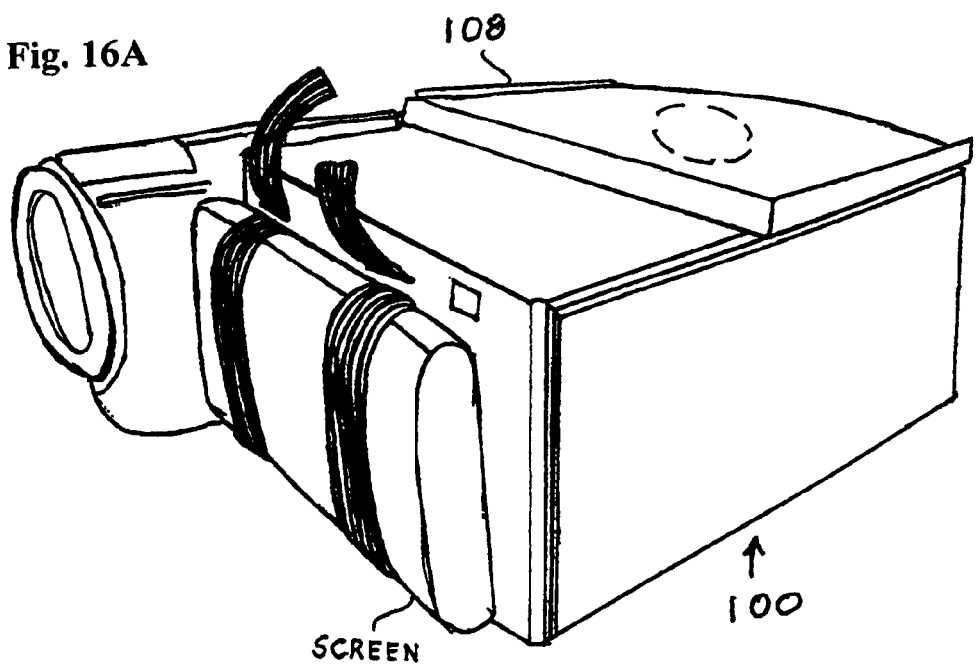
FIG. 16A is a perspective of the embodiment attached to the screen of a camera in which the lens has been rotated 270 degrees from the in-use position to a stored position whereby the device has been converted from a viewfinder device to a glare reduction device.
Figure 16B:
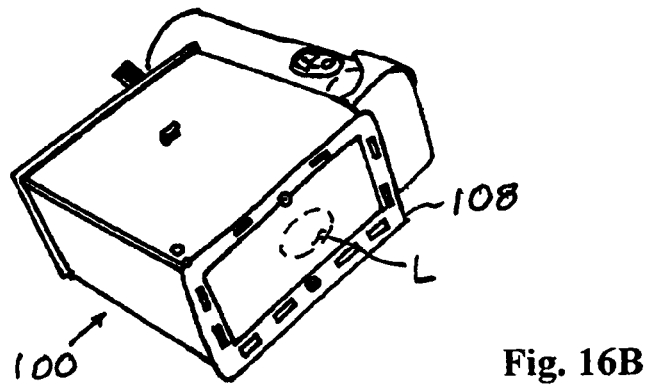
FIG. 16B is a perspective of the embodiment attached to the screen of a camera in which the lens is fastened in place.

FIG. 16A shows the device 100 being held onto the screen of a recording device and in which the lens frame 108 has been folded upward by 270 degrees from its operating position. In this configuration, the device acts as a glare reducer, while the user looks through the device at the screen of the recording apparatus. FIG. 16B shows the same set up to a recording device except the lens frame 108 along with the lens L have been rotated into position so that the device now acts as a view finder.

In the foregoing descriptions the lens has been illustrated as a planar Fresnel type, however an optically shaped lens could be used, but with added bulk.

SCOPE OF THE INVENTION

The above presents a description of the best mode I contemplate of carrying out my device and method and of the manner and process of making and using them, in such full, clear, concise, and exact terms as to enable any person skilled in the art to make and use my device and method. My device and method are, however, susceptible to modifications and alternate constructions from the illustrative embodiments discussed above which are fully equivalent. Consequently, it is not my intention to limit my device and method to the particular embodiments disclosed. On the contrary, my intention is to cover all modifications and alternate constructions coming within the spirit and scope of my device and method as generally expressed by the following claims, which particularly point out and distinctly claim the subject matter of my invention:

The invention claimed is:

1. A glare blocking viewfinder device adapted to be detachably mounted on an image display device, said image display device being substantially flat and rectangular and having predetermined width and height dimensions, said glare blocking viewfinder device comprising:
   a box portion having opposite sides panels and opposite horizontal panels defining a top panel and a bottom panel, the side panels being joined at adjoining edges to the top and bottom panels by hinges to form a box that can be in an open position and folded to a collapsed position and in the open position forming a rectangular opening at opposite ends, the openings defining an attachment end and a viewing end and further comprising an attaching frame at the attachment end attached by a hinge to one of the panels and a viewing frame at the viewing end attached by a hinge to a panel that is opposite to the one on which the attaching frame is hinged;
   a lens mounted in or integral to the viewing frame;
   an attachment mechanism on the viewing frame;
   whereby the glare blocking viewfinder can be configured for two forms of use, as a viewfinder with the viewing frame and lens in place over the viewing end and the attachment frame in place over the attaching end and as a glare reducing box with the viewing frame rotated up to 270 degrees into contact with the panel to which it is hinged and also having a storage configuration in which the box portion is collapsed and the attachment frame is folded into contact with the panel to which it is attached on one side of the folded box and the viewing frame and lens is folded into contact with the panel to which it is attached on the other side of the folded box.

2. The glare blocking viewfinder device of claim 1 where the lens has a magnifying power of 2× to 5×.

3. The glare blocking viewfinder device of claim 1 where the attachment mechanism comprises at least one elastic member extending across the attachment end.

4. The glare blocking viewfinder device of claim 1 where the attachment mechanism includes a magnet.

5. The glare blocking viewfinder device of claim 1 where the attachment mechanism comprises a hook and pile two-component connector.

6. The glare blocking viewfinder device of claim 1 where the attachment mechanism comprises an open sleeve with opposed open sidewalls and opposed open ends, enabling the image display device to be inserted into the sleeve through one end and images thereon to be viewed through the device.

7. The glare blocking viewfinder device of claim 1 having a width dimension where the width dimension is sufficient to accommodate both eyes viewing the monitor screen at the same time.

8. The glare blocking viewfinder device of claim 7 where the width dimension is substantially from 3.5 to 5 inches.

9. The glare blocking viewfinder of claim 1 wherein at least the box portion is one piece of molded plastic and the hinges are living hinges.

10. The glare blocking viewfinder of claim 8 wherein the attaching frame and the viewing frame are also part of the one piece of molded plastic and are attached by living hinges.

\* \* \* \* \*